United States Patent
Gladden et al.

(10) Patent No.: US 7,617,138 B1
(45) Date of Patent: Nov. 10, 2009

(54) ESTIMATING FINANCIAL VALUATION OF BENEFIT PLANS

(75) Inventors: Jason S. Gladden, McKinney, TX (US); Steven J. Gould, Dover, MA (US); William B. Gulliver, Stamford, CT (US); Huw G. Phillips, Hartsdale, NY (US); Michael F. Pollack, Stamford, CT (US); Aaron Weindling, Philadelphia, PA (US)

(73) Assignee: Towers Perrin Forster & Crosby, Inc., Philadelphia, PA (US)

(*) Notice: Subject to any disclaimer, the term of this patent is extended or adjusted under 35 U.S.C. 154(b) by 876 days.

(21) Appl. No.: 11/140,279

(22) Filed: May 27, 2005

Related U.S. Application Data

(60) Provisional application No. 60/575,494, filed on May 28, 2004.

(51) Int. Cl.
*G07B 17/60* (2006.01)
*G06F 17/60* (2006.01)

(52) U.S. Cl. ............................................. 705/30; 705/1

(58) Field of Classification Search ............. 705/26–30, 705/1
See application file for complete search history.

(56) References Cited

U.S. PATENT DOCUMENTS

| | | | |
|---|---|---|---|
| 5,806,047 | A | 9/1998 | Hackel et al. |
| 5,812,987 | A | 9/1998 | Luskin et al. |
| 5,878,405 | A | 3/1999 | Grant et al. |
| 6,012,043 | A | 1/2000 | Albright et al. |
| 6,021,397 | A | 2/2000 | Jones et al. |
| 6,154,732 | A | 11/2000 | Tarbox |
| 6,173,276 | B1 | 1/2001 | Kant et al. |
| 6,401,079 | B1 | 6/2002 | Kahn et al. |
| 6,985,880 | B1 | 1/2006 | Hodgdon et al. |
| 7,016,870 | B1 | 3/2006 | Jones et al. |
| 7,062,458 | B2 | 6/2006 | Maggioncalda et al. |
| 7,089,201 | B1 | 8/2006 | Dellinger et al. |
| 7,113,913 | B1 | 9/2006 | Davis et al. |
| 7,120,601 | B2 | 10/2006 | Chen et al. |
| 7,155,407 | B2 | 12/2006 | Bowser |
| 7,216,099 | B2 | 5/2007 | Chen et al. |
| 7,243,081 | B2 | 7/2007 | Friend et al. |
| 7,249,077 | B2 | 7/2007 | Williams et al. |

(Continued)

OTHER PUBLICATIONS

"Market Valuation of Excess Pension Assets", the Journal of Risk and Insurance by Helen M. Bowers, 1995-06-01, vol. 62, Iss.2;p. pp. 214-229.*

*Primary Examiner*—Matthew Gart
*Assistant Examiner*—Garcia Ade
(74) *Attorney, Agent, or Firm*—King & Spalding LLP

(57) ABSTRACT

Intra-year benefit plan financial valuation for a client's post-retirement benefit plan comprises collecting intra-year capital market data during a time period between a first actuarial valuation and a second actuarial valuation, converting the intra-year capital market data to intra-year client-specific data based on client assumptions, and calculating an updated financial valuation for the benefit plan based on the intra-year client-specific data, benefit plan data, and the client assumptions. The updated financial valuation can comprise an updated forecast financial valuation based on the intra-year client-specific data and future client assumptions. The updated financial valuation can be calibrated based on actual client-specific data reflecting experience between the time of the first actuarial valuation and the updated financial valuation. The intra-year client-specific data can provide a basis for a hypothetical forecast analysis based on hypothetical data provided by the client.

28 Claims, 21 Drawing Sheets

U.S. PATENT DOCUMENTS

| | | |
|---|---|---|
| 7,302,413 B1 | 11/2007 | Bent et al. |
| 7,305,347 B1 | 12/2007 | Joao |
| 7,343,333 B2 | 3/2008 | Menke |
| 7,398,241 B2 | 7/2008 | Fay et al. |
| 7,454,376 B1 | 11/2008 | Argenbright |
| 7,457,774 B1 | 11/2008 | Bridges et al. |
| 2002/0035527 A1 | 3/2002 | Corrin |
| 2002/0049617 A1 | 4/2002 | Lencki et al. |
| 2002/0138386 A1 | 9/2002 | Maggioncalda et al. |
| 2002/0184148 A1 | 12/2002 | Kahn et al. |
| 2002/0188540 A1 | 12/2002 | Fay et al. |
| 2003/0088492 A1 | 5/2003 | Damschroder |
| 2003/0120508 A1 | 6/2003 | Kizor et al. |
| 2004/0039667 A1* | 2/2004 | Winklevoss et al. ............ 705/35 |
| 2004/0054610 A1 | 3/2004 | Amstutz et al. |
| 2004/0088236 A1 | 5/2004 | Manning |
| 2004/0117202 A1* | 6/2004 | Winklevoss et al. ............. 705/1 |
| 2004/0215493 A1* | 10/2004 | Koppes et al. .................. 705/4 |
| 2004/0249660 A1* | 12/2004 | Williams et al. ................ 705/1 |
| 2004/0267651 A1 | 12/2004 | Jenson et al. |
| 2005/0004855 A1 | 1/2005 | Jenson et al. |
| 2005/0004856 A1 | 1/2005 | Brose et al. |
| 2005/0010510 A1 | 1/2005 | Brose et al. |
| 2005/0027632 A1 | 2/2005 | Zeitoun et al. |
| 2005/0060209 A1 | 3/2005 | Hill et al. |
| 2005/0065873 A1 | 3/2005 | Hendrickson et al. |
| 2005/0096973 A1 | 5/2005 | Heyse et al. |
| 2005/0137953 A1 | 6/2005 | McDonough et al. |
| 2005/0246260 A1 | 11/2005 | Hodgdon et al. |
| 2006/0010053 A1 | 1/2006 | Farrow |
| 2006/0059058 A1 | 3/2006 | Sturiale et al. |
| 2006/0080200 A1* | 4/2006 | Ashton et al. .................. 705/35 |
| 2006/0089862 A1 | 4/2006 | Anandarao et al. |
| 2006/0122924 A1 | 6/2006 | Brustkern et al. |
| 2006/0149651 A1 | 7/2006 | Robinson |
| 2006/0190372 A1 | 8/2006 | Chhabra et al. |
| 2006/0229964 A1 | 10/2006 | Fox |
| 2006/0253364 A1 | 11/2006 | Tarbox et al. |
| 2006/0282363 A1 | 12/2006 | Tarbox et al. |
| 2006/0293984 A1 | 12/2006 | Loch et al. |
| 2007/0005463 A1 | 1/2007 | Davis et al. |
| 2007/0005468 A1 | 1/2007 | Feller et al. |
| 2007/0011069 A1 | 1/2007 | Bevacqua |
| 2007/0011071 A1 | 1/2007 | Cuscovitch et al. |
| 2007/0033124 A1 | 2/2007 | Herr et al. |
| 2007/0038542 A1 | 2/2007 | Armstrong et al. |
| 2007/0050264 A1 | 3/2007 | Lewis |
| 2007/0055601 A1 | 3/2007 | Inderski et al. |
| 2007/0055605 A1 | 3/2007 | Moore et al. |
| 2007/0061238 A1 | 3/2007 | Merton et al. |
| 2007/0083455 A1 | 4/2007 | Bove et al. |
| 2007/0100727 A1 | 5/2007 | Multer et al. |
| 2007/0106589 A1 | 5/2007 | Schirripa |
| 2007/0143199 A1 | 6/2007 | Stiff et al. |
| 2007/0168302 A1 | 7/2007 | Giovinazzo et al. |
| 2007/0226111 A1 | 9/2007 | Tan-Torres |
| 2007/0239579 A1 | 10/2007 | Gulotta et al. |
| 2007/0244777 A1 | 10/2007 | Torre et al. |
| 2007/0250427 A1 | 10/2007 | Robinson |
| 2007/0255635 A1 | 11/2007 | Multer et al. |
| 2007/0271201 A1 | 11/2007 | Armand et al. |
| 2007/0282731 A1 | 12/2007 | Guichard |
| 2007/0288396 A1 | 12/2007 | Armand et al. |
| 2007/0288399 A1 | 12/2007 | Reynolds et al. |
| 2008/0010086 A1 | 1/2008 | Skelly et al. |
| 2008/0010095 A1 | 1/2008 | Joyce |
| 2008/0033886 A1 | 2/2008 | Witz |
| 2008/0040149 A1 | 2/2008 | Joao |
| 2008/0052133 A1 | 2/2008 | Kravirtz et al. |
| 2008/0052210 A1 | 2/2008 | Mercier et al. |
| 2008/0059271 A1 | 3/2008 | Thomann et al. |
| 2008/0065522 A1 | 3/2008 | Diffenderffer |
| 2008/0077519 A1 | 3/2008 | Pedersen et al. |
| 2008/0082460 A1 | 4/2008 | Hutcheson et al. |
| 2008/0097797 A1 | 4/2008 | Morris et al. |
| 2008/0109264 A1 | 5/2008 | Menke |
| 2008/0109346 A1 | 5/2008 | Valentino et al. |
| 2008/0114703 A1 | 5/2008 | Dahlberg et al. |
| 2008/0133279 A1 | 6/2008 | Pollock et al. |
| 2008/0133280 A1 | 6/2008 | Ziegler |
| 2008/0140586 A1 | 6/2008 | Mercier et al. |
| 2008/0154792 A1 | 6/2008 | Maggioncalda et al. |
| 2008/0168006 A1 | 7/2008 | Merton et al. |
| 2008/0183506 A1 | 7/2008 | Mamorsky |
| 2008/0183510 A1 | 7/2008 | Pollock et al. |
| 2008/0189221 A1 | 8/2008 | Coughlan et al. |
| 2008/0189222 A1 | 8/2008 | Coughlan et al. |
| 2008/0208765 A1 | 8/2008 | Zissu et al. |
| 2008/0270194 A1 | 10/2008 | West et al. |
| 2008/0281742 A1 | 11/2008 | Lyons et al. |
| 2008/0288383 A1 | 11/2008 | Bernard |
| 2008/0301035 A1 | 12/2008 | Mercier et al. |
| 2008/0306878 A1 | 12/2008 | Elam et al. |
| 2009/0006237 A1 | 1/2009 | Fay et al. |
| 2009/0018873 A1 | 1/2009 | Ramos et al. |
| 2009/0018953 A1 | 1/2009 | Cassano et al. |
| 2009/0030740 A1 | 1/2009 | Robinson |
| 2009/0048961 A1 | 2/2009 | Mott |

* cited by examiner

| Ticker | Current Value | ID | SubName | Description |
|---|---|---|---|---|
| ATS CURNCY | 10.7134 | ATS | (ATS/USD) | Austrian Schilling per US Dollar |
| AUD CURNCY | 1.2947 | AUD | (AUD/USD) | Australian Dollar per US Dollar |
| BRL CURNCY | 2.4505 | BRL | (BRL/USD) | Brazilian Real per US Dollar |
| CAD CURNCY | 1.2378 | CAD | (CAD/USD) | Canadian Dollar per US Dollar |
| CHF CURNCY | 1.2055 | CHF | (CHF/USD) | Swiss Franc per US Dollar |
| CNY CURNCY | 8.2765 | CNY | (CNY/USD) | Chinese Renminbi Yuan per US Dollar |
| DKK CURNCY | 5.7943 | DKK | (DKK/USD) | Danish Krone per US Dollar |
| EUR CURNCY | 0.7787 | EUR | (EUR/USD) | Euro per US Dollar |
| GBP CURNCY | 0.5308 | GBP | (GBP/USD) | UK Pounds per US Dollar |
| HKD CURNCY | 7.7964 | HKD | (HKD/USD) | Hong Kong Dollar per US Dollar |
| INR CURNCY | 43.4800 | INR | (INR/USD) | Indian Rupee per US Dollar |
| JPY CURNCY | 105.6300 | JPY | (JPY/USD) | Japanese Yen per US Dollar |
| KRW CURNCY | 1000.5000 | KRW | (KRW/USD) | Korean Won per US Dollar |
| MXN CURNCY | 10.9639 | MXN | (MXN/USD) | Mexican Peso per US Dollar |
| NOK CURNCY | 6.3155 | NOK | (NOK/USD) | Norwegian Krone per US Dollar |
| NZD CURNCY | 1.3699 | NZD | (NZD/USD) | New Zealand Dollar per US Dollar |
| SEK CURNCY | 7.1460 | SEK | (SEK/USD) | Swedish Krona per US Dollar |
| TWD CURNCY | 31.2240 | TWD | (TWD/USD) | Taiwanese NT Dollar per US Dollar |
| USD CURNCY | 1.0000 | USD | (USD/USD) | US Dollar per US Dollar |
| ZAR CURNCY | 6.1202 | ZAR | (ZAR/USD) | S. African Rand per US Dollar |

Figure 8

| | A | B | C | D | E | F | G |
|---|---|---|---|---|---|---|---|
| 1 | Ticker Symbol | Category | Currency | Value | ID | Name | SubName |
| 2 | Nomura Bond Performance Index | Price | JPY | 299.6670 | 1 | Nomura Bond Performance Index | Domestic Fixed Income |
| 3 | SSB WGBI ex Japan hedged | Price | JPY | 281.5600 | 2 | SSB WGBI ex Japan hedged | International Fixed Income (hedged) |
| 4 | iBoxx Euro Indices 10yr+ All Stock | Yield | EUR | 4.2500 | 3 | iBoxx Euro Indices 10yr+ All Stock | Eurozone Discount Rate |
| 5 | iBoxx Sterling Indices 15yr+ All Stock | Yield | GBP | 5.3400 | 4 | iBoxx Sterling Indices 15yr+ All Stock | United Kingdom Discount Rate |
| 6 | Australia AA-Rated Corporate Securities | Yield | AUD | 5.9800 | 84 | Australia AA-Rated Composite Securities | Australia Discount Rate |
| 7 | Brazil Discount Rate | Yield | BRL | 10.7800 | 5 | Brazil Discount Rate | Brazil Discount Rate |
| 8 | Canada Discount Rate | Yield | CAD | 5.6000 | 7 | Canada Discount Rate | Canada Discount Rate |
| 9 | Japan Discount Rate | Yield | JPY | 2.0000 | 8 | Japan Discount Rate | Japan Discount Rate |
| 10 | New Zealand Discount Rate | Yield | NZD | 0.0000 | 9 | New Zealand Discount Rate | New Zealand Discount Rate |
| 11 | South Africa Discount Rate | Yield | ZAR | 9.0000 | 10 | South Africa Discount Rate | South Africa Discount Rate |
| 12 | Citigroup High Grade Credit Index | Yield | USD | 5.2930 | 96 | Citigroup High Grade Credit Index | |
| 13 | Merrill Lynch US Corporate AA-AAA Rates 10+ yrs | Yield | USD | 5.5780 | 97 | Merrill Lynch US Corporate AA-AAA Rates 10+ yrs | |
| 14 | Lehman Brothers US A Long Credit | Yield | USD | 5.6900 | 98 | Lehman Brothers US A Long Credit | |
| 15 | Composite Corporate Bond Rate | Yield | USD | 5.5203 | 151 | Avg of Citigroup Credit, ML HQ 10+ and LB A Long Credit | |
| 16 | Lehman Brothers Aggregate | Yield | USD | 103.5600 | 169 | Lehman Brothers Aggregate | |
| 17 | 912810FP8 Govt | Yield | USD | 4.625 | 150 | US TREASURY N/B | US TREASURY N/B |
| 18 | SBMMTB3 Index | Price | USD | 541.7320 | 11 | Citigroup 3 Month Treas Bill L | Cash return |
| 19 | SG13YL Index | Yield | USD | 2.7872 | 12 | Citigroup 3 Month Treas Bill Y | US Cash yield |
| 20 | CPURNSA Index | Price | USD | 193.3000 | 13 | US CPI Urban Consumers NSA | US CPI |
| 21 | OAUH06N Index | CPI | AUD | 114.1000 | 14 | OECD Australia Consumer Price | Australia CPI |
| 22 | CPALBE Index | CPI | EUR | 116.9000 | 15 | Eurostat Belgium HICP All Item | Belgium CPI |
| 23 | BZPI1P15 Index | CPI | BRL | 2392.6400 | 16 | IBGE Brazil CPI Extended Nati | Brazil CPI |
| 24 | OECAC007 Index | CPI | CAD | 110.6000 | 17 | OECD Canada Consumer Price Ind | Canada CPI |
| 25 | DNCPINEW Index | CPI | EUR | 109.8000 | 18 | Denmark CPI | Denmark CPI |
| 26 | CPALFR Index | CPI | EUR | 115.1000 | 19 | Eurostat France HICP All Items | France CPI |
| 27 | CPALDE Index | CPI | EUR | 112.1000 | 20 | Eurostat Germany HICP All Item | Germany CPI |
| 28 | HKCPI Index | CPI | HKD | 92.5000 | 21 | Hong Kong CPI Composite All It | Hong Kong CPI |
| 29 | CPALIE Index | CPI | EUR | 130.7000 | 22 | Eurostat Ireland HICP All Item | Ireland CPI |
| 30 | CPALIT Index | CPI | EUR | 121.3000 | 23 | Eurostat Italy HICP All Items | Italy CPI |
| 31 | JNCPI Index | CPI | | 98.8000 | 24 | Japan CPI Nationwide | Japan CPI |
| 32 | MXCPI Index | CPI | MXN | 113.4380 | 25 | Mexico CPI | Mexico CPI |
| 33 | CPALNL Index | CPI | EUR | 124.5000 | 26 | Eurostat Netherlands HICP All | Netherlands CPI |
| 34 | ONCP01N Index | CPI | NZD | 110.9700 | 27 | OECD New Zealand Total Consume | New Zealand CPI |
| 35 | NOCPI Index | CPI | NOK | 114.2000 | 28 | Norway CPI | Norway CPI |
| 36 | SACPIC Index | CPI | ZAR | 133.3000 | 29 | South Africa CPI Core | South Africa CPI |
| 37 | CPALES Index | CPI | EUR | 128.4000 | 30 | Eurostat Spain HICP All Items | Spain CPI |
| 38 | SZCPII Index | CPI | CHF | 104.2000 | 31 | Switzerland CPI 2000 = 100 | Switzerland CPI |
| 39 | TWCPI Index | CPI | | 101.9500 | 32 | Taiwan CPI NSA | Taiwan CPI |
| 40 | CPALUK Index | CPI | EUR | 112.2000 | 33 | Eurostat UK HICP All Items NSA | UK CPI |
| 41 | OEATC005 Index | CPI | | 110.0000 | 152 | OECD Austria CPI All Items | Austria CPI |
| 42 | OEINC001 Index | CPI | | 119.0000 | 153 | OECD India CPI All Items | India CPI |
| 43 | OEKRC006 Index | CPI | | 117.8000 | 154 | OECD Korea CPI All Items | Korea CPI |
| 44 | OSWH08N Index | CPI | | 107.1000 | 155 | OECD CPI All Items Sweden | Sweden CPI |
| 45 | RU25INTR Index | Price | USD | 682.1400 | 34 | Russell 2500 Total Return Inde | Domestic Small Cap Equity |
| 46 | IBOV Index | Price | BRL | 25464.7500 | 36 | BRAZIL BOVESPA STOCK IDX | Domestic Equity |
| 47 | 0000AR Index | Price | CAD | 22301.2100 | 37 | S&P/TSX COMPOS TR INDEX | Domestic Equity |
| 48 | KAX Index | Price | DKK | 290.2701 | 38 | KAX COPENHAGEN ALL SHARE | Domestic Equity |
| 49 | NDDLEMU Index | Price | Local | 186.6110 | 39 | MSCI Daily TR Net EMU Local | Domestic Equity |
| 50 | HSCI Index | Price | HKD | 1833.7261 | 40 | HANG SENG COMPOSITE INDX | Domestic Equity |
| 51 | TPX Index | Price | JPY | 1156.6946 | 41 | TOPIX INDEX (TOKYO) | Domestic Equity |
| 52 | MEXBOL Index | Price | MXN | 12639.3749 | 42 | MEXICO BOLSA INDEX | Domestic Equity |

Figure 9A

| | A | B | C | D | E | F | G |
|---|---|---|---|---|---|---|---|
| 53 | NZSE Index | Price | NZD | 952.0829 | 43 | NZSX ALL ORDINARIES IDX | Domestic Equity |
| 54 | OSEBX Index | Price | NOK | 253.4700 | 44 | OSE BENCHMARK INDEX | Domestic Equity |
| 55 | JALSH Index | Price | ZAR | 13159.5300 | 45 | FTSE/JSE AFRICA ALL SHR | Domestic Equity |
| 56 | SMI Index | Price | CHF | 6042.9400 | 46 | SWISS MARKET INDEX | Domestic Equity |
| 57 | TWOTCI Index | Price | TWD | 114.6900 | 47 | TAIWAN GRE TAI EXCHANGE | Domestic Equity |
| 58 | ASX Index | Price | GBP | 2473.9235 | 48 | FTSE ALL-SHARE INDEX | Domestic Equity |
| 59 | SPTR Index | Price | USD | 1760.8680 | 49 | Standard & Poors 500 Total Ret | Domestic Large Cap Equity |
| 60 | SBABCRP Index | Price | AUD | 139.2357 | 50 | Citigroup AusBIG Corporate AUD | Domestic Fixed Income |
| 61 | SBBIG Index | Price | USD | 990.2281 | 51 | Citigroup BIG Bond | Domestic Fixed Income |
| 62 | SMOBWBTR Index | Price | CAD | 757.6400 | 52 | Scotia Capital Long Term Overa | Domestic Fixed Income |
| 63 | SBSZL Index | Price | CHF | 282.5909 | 53 | Citigroup Switzerland GBI All | Domestic Fixed Income |
| 64 | SMOBUTR Index | Price | CAD | 563.6800 | 54 | Scotia Capital Universe Overal | Domestic Fixed Income |
| 65 | SBEB Index | Price | EUR | 139.5090 | 55 | Citigroup EuroBIG All | Domestic Fixed Income |
| 66 | GCETAA91 Index | Price | | 10.0000 | 56 | Mexico Treasuries Cetes 91D | Domestic Fixed Income |
| 67 | FTRFBGH Index | Price | GBP | 2064.2800 | 57 | FTSE Actuaries Govt Securities UK Gilts TR over 15 years | Domestic Fixed Income |
| 68 | FTRFILA Index | Price | GBP | 1859.5900 | 58 | FTSE Actuaries Govt Securities UK Index Linked TR All Stock | Domestic Fixed Income (Index Linked) |
| 69 | FTRFILO Index | Price | GBP | 2044.6900 | 156 | FTSE Actuaries Govt Securities UK Index Linked TR over 15 y | Domestic Fixed Income (Index Linked) |
| 70 | MOODCAA Index | Yield | USD | 5.4100 | 59 | Moody's Bond Indices Corporate | US Discount Rate |
| 71 | GACGB9 Index | Yield | | 5.3940 | 60 | Australian Government Bonds 9 | Australia Discount Rate |
| 72 | GDGB10YR Index | Yield | | 3.4770 | 61 | Denmark Government Bonds 10 Ye | Denmark Discount Rate |
| 73 | HKG10S Index | Yield | HKD | 3.8100 | 62 | BFV Hong Kong Interpolated Yie | Hong Kong Discount Rate |
| 74 | C47B10Y Index | Yield | | 10.5318 | 63 | Mexico Govt 10 Year MXN | Mexico Discount Rate |
| 75 | GNOR10YR Index | Yield | | 3.8130 | 64 | NORWAY GOVERNMENT BONDS 10 YEA | Norway Discount Rate |
| 76 | GSWISS10 Index | Yield | CHF | 2.0810 | 65 | Swiss Generic Government Bond | Switzerland Discount Rate |
| 77 | GVTW10YR Index | Yield | | 2.1290 | 66 | Taiwan Government Bonds 10 Yea | Taiwan Discount Rate |
| 78 | NDDUEAFE Index | Price | USD | 3114.2090 | 67 | MSCI Daily TR Net EAFE USD | International Equity |
| 79 | NDDUWXA Index | Price | USD | 2508.7280 | 68 | MSCI Daily TR Net WORLD x AUSTRALIA USD | Australia International Equity |
| 80 | NDDUWXEM Index | Price | USD | 151.2150 | 69 | MSCI Daily TR Net WORLD x EMU USD | International Equity |
| 81 | NDDUWI Index | Price | USD | 2499.8280 | 70 | MSCI Daily TR Net WORLD USD | International Equity |
| 82 | NDDUWI Index NEW ZEALAND | | NZD | 3410.7233 | 134 | MSCI Daily TR Net WORLD USD (times New Zealand xrate) | International Equity |
| 83 | NDDUWI Index NORWAY | | NOK | 15724.5087 | 135 | MSCI Daily TR Net WORLD USD (times Norway xrate) | International Equity |
| 84 | NDDUWI Index SOUTH AFRICA | | ZAR | 15238.2453 | 136 | MSCI Daily TR Net WORLD USD (times South Africa xrate) | International Equity |
| 85 | FTAW03 Index | Price | USD | 177.1700 | 71 | FTSE ALL-WORLD EX UK IDX | UK International Equity |
| 86 | NDDUKOK Index | Price | USD | 2712.6020 | 72 | MSCI Daily TR Net KOKUSAI USD | Japan International Equity |
| 87 | NDDUKOK Index JAPAN | | JPY | 286532.1493 | 137 | MSCI Daily TR Net KOKUSAI USD (times Japan xrate) | International Equity |
| 88 | SBNZL Index | Price | NZD | 246.7810 | 75 | Citigroup New Zealand GBI Local Currency | Domestic Fixed Income |
| 89 | SBNKL Index | Price | NOK | 216.0314 | 76 | Citigroup Norway GBI All Maturities Local Currency | Domestic Fixed Income |
| 90 | RU10INTR Index | Price | USD | 2747.8700 | 77 | Russell 1000 Total Return Index | Domestic Equity |
| 91 | RU20INTR Index | Price | USD | 2498.5200 | 78 | Russell 2000 Total Return Index | Domestic Equity |
| 92 | RU30INTR Index | Price | USD | 2708.2100 | 79 | Russell 3000 Total Return Index | Domestic Equity |
| 93 | SBBIGLNG Index | Price | USD | 1333.9826 | 80 | Citigroup BIG Long Term 10+ Years Local Currency | Domestic Fixed Income (Long) |
| 94 | NDDUWXUS Index | Price | USD | 3099.2600 | 81 | MSCI Daily TR Net World x USA USD | International Equity |
| 95 | IDRICOPD Index | Price | USD | 367.4500 | 82 | Standard & Poor's/IFC Emerging Market Regional Investable C | International Equity |
| 96 | SBUK15L Index | Price | GBP | 770.8259 | 83 | Citigroup UK GBI 15+ Year Local Currency | Domestic Fixed Income |
| 97 | SWISS Real Estate Index | | CHF | 114.1609 | 85 | Switzerland Real Estate (Swiss CPI +4%) | Switzerland Real Estate |
| 98 | EDS US Index | | USD | 142.9867 | 86 | Generic US Alternative Index | EDS US Index |
| 99 | Standard & Poors 500 Total Ret CANADA | | CAD | 2179.6024 | 89 | Standard & Poors 500 Total Ret (times Canada xrate) | International Equity |
| 100 | MSCI Daily TR Net EAFE USD CANADA | | CAD | 3854.7679 | 90 | MSCI Daily TR Net EAFE USD (times Canada xrate) | International Equity |
| 101 | MSCI Daily TR Net WORLD x AUSTRALIA USD AUSTRALIA | | AUD | 3247.9648 | 91 | MSCI Daily TR Net WORLD x AUSTRALIA USD (times Australia | International Equity |
| 102 | MSCI Daily TR Net WORLD x EMU USD EURO | | EUR | 117.7504 | 92 | MSCI Daily TR Net WORLD x EMU USD (times Euro xrate) | International Equity |
| 103 | MSCI Daily TR Net WORLD USD HONG KONG | | HKD | 19411.6950 | 93 | MSCI Daily TR Net WORLD USD (times Hong Kong xrate) | International Equity |

Figure 9B

| | A | B | C | D | E | F | G |
|---|---|---|---|---|---|---|---|
| 104 | MSCI Daily TR Net WORLD USD SWITZERLAND | | CHF | 3001.4877 | 94 | MSCI Daily TR Net WORLD USD (times Switzerland xrate) | International Equity |
| 105 | FTSE ALL-WORLD EX UK IDX UK | | GBP | 94.0393 | 95 | FTSE ALL-WORLD EX UK IDX (times UK xrate) | International Equity |
| 106 | MSHUWXUS Index | Price | USD | 196.34 | 100 | MSCI Hedged Indices in USD World X US | International Equity (really hedged) |
| 107 | JPCAAU3M Index | Price | AUD | 371.322 | 101 | JP Morgan Australia Dollar Cash Index 3 Month | Cash Return |
| 108 | JPCACA3M Index | Price | CAD | 290.452 | 102 | JP Morgan Canada Dollar Cash Index 3 Month | Cash Return |
| 109 | JPCACH3M Index | Price | CHF | 190.453 | 103 | JP Morgan Cash Index Swiss Franc 3 Month | Cash Return |
| 110 | JPCAEU3M Index | Price | EUR | 278.899 | 104 | JP Morgan Cash Index Euro Currency 3 Month | Cash Return |
| 111 | JPCAJP3M Index | Price | JPY | 149.014 | 105 | JP Morgan Cash Index Japanese Yen 3 Month | Cash Return |
| 112 | NDDLWI Index | Price | Local | 1848.197 | 106 | MSCI Daily TR Net World Local | International Equity (hedged) |
| 113 | NDDLWXA Index | Price | Local | 1850.784 | 107 | MSCI Daily TR Net World ex Australia Local | International Equity (hedged) |
| 114 | NDDLWXEM Index | Price | Local | 147.515 | 108 | MSCI Daily TR Net World ex EMU Local | International Equity (hedged) |
| 115 | NDDLWXUS Index | Price | Local | 1691.737 | 109 | MSCI Daily TR Net World ex USA Local | International Equity (hedged) |
| 116 | EDS MSCI World x US 50% Hedged Index | Price | | 2395.4985 | 110 | EDS MSCI World x US 50% Hedged Index | EDS MSCI World x US 50% Hedged Index |
| 117 | ASA51 Index | Price | | 22759.3 | 111 | S&P/ASX Accumulation 200 Index | Domestic Equity |
| 118 | ASA52 Index | Price | | 22713.5 | 112 | S&P/ASX Accumulation 300 Index | Domestic Equity |
| 119 | ASA6PROP Index | Price | | 27046.93 | 113 | S&P/ASX 300 Property Accumulation Index | Alternative Class (REITs) |
| 120 | GDALCPJH Index | Price | Local | 367.79 | 114 | MSCI Daily Total Return All Country Pacific Gross Free Ex Jap | International Equity (regional hedged) |
| 121 | HKBIO Index | Price | HKD | 219.148 | 115 | Hong Kong HSBC Bond Indices Total Return | Domestic Fixed Income |
| 122 | NDDLKOK Index | Price | Local | 2481.642 | 117 | MSCI Daily Total Return Net Kokusai Local | International Equity (hedged) |
| 123 | NR/XTR Index | Price | | 2806.2393 | 119 | Nareit Index Total Return | Alternative Class (REITs) |
| 124 | SB3MHDL Index | Price | HKD | 132.83 | 120 | Citigroup Hong Kong Dollar 3 Month Eur Deposit Local Curren | Cash Return |
| 125 | SBCSIX Index | Price | USD | 359.67 | 121 | Citigroup Convertible Securities Index | Alternative Class (convertibles) |
| 126 | SBHYMI Index | Price | USD | 401.2178 | 122 | Citigroup HY Market Local Currency | Alternative Class (high yield) |
| 127 | SBNMEU Index | Price | EUR | 124.5387 | 123 | Citigroup Non Euro WGBI All Maturities EUR | International Fixed Income |
| 128 | SBNUL Index | Price | Local | 439.7635 | 124 | Citigroup Non USD WGBI All Maturities Local Currency | International Fixed Income (hedged) |
| 129 | SBNUU Index | Price | USD | 803.0534 | 125 | Citigroup Non USD WGBI All Maturities USD | International Fixed Income |
| 130 | SBWGADU Index | Price | AUD | 703.0576 | 126 | Citigroup WGBI All Maturities AUD | International Fixed Income |
| 131 | SBWGHKU Index | Price | HKD | 652.468 | 127 | Citigroup WGBI All Maturities HKD | International Fixed Income |
| 132 | SBWGS2U Index | Price | CHF | 303.0206 | 128 | Citigroup WGBI All Maturities CHF | International Fixed Income |
| 133 | SPREIT Index | Price | USD | 142.11 | 129 | S&P REIT Index | Alternative Class (REITs) |
| 134 | SBABIG Index | Price | AUD | 137.2759 | 130 | Citigroup AusBIG AUD | Domestic Fixed Income |
| 135 | SBNML Index | Price | Local | 128.1928 | 131 | Citigroup Non Euro WGBI All Maturities Local Currency | International Fixed Income (hedged) |
| 136 | SBWGL Index | Price | Local | 476.6157 | 132 | Citigroup WGBI All Maturities Local Currency | International Fixed Income (hedged) |
| 137 | MSEUCAF Index | Price | USD | 473.842 | 133 | MSCI Daily TR Emerging Markets USA USD | International Equity |
| 138 | JPS2CRXI Index | Price | GBP | 149.07 | 157 | JP Morgan Eurosterling Corporates All Maturities | |
| 139 | VIBC3M Index | Yield | ATS | 2.128 | 158 | Vienna Interbank Offer Rate 3 Month | Cash Return |
| 140 | ITBITB3M Index | Price | INR | 204.54 | 159 | India JP Morgan T-Bill 3 Month | Cash Return |
| 141 | KOTB3MO Index | Yield | KRW | 3.39 | 160 | Korean Treasury Bond 3 Month | Cash Return |
| 142 | JPCASE3M Index | Price | SEK | 347.347 | 161 | Cash Indices are calculated daily, based on euro-currency dep | Cash Return |
| 143 | GING10Y Index | Yield | INR | 7.18 | 162 | Generic Indian Government Notes/Bonds 10 Year | Domestic Fixed Income |
| 144 | KPGB10YR Index | Yield | KRW | 4.54 | 163 | KIS Pricing Inc Korean Government Bonds 10 Year | Domestic Fixed Income |
| 145 | GSGB10YR Index | Yield | SEK | 3.473 | 164 | Generic Swedish Notes/Bonds 10 Years | Domestic Fixed Income |
| 146 | ATX Index | Price | EUR | 2582.38 | 165 | Austrian Traded ATX Index | Domestic Equity |
| 147 | SENSEX Index | Price | INR | 6481.35 | 166 | Mumbai Sensex 30 Index | Domestic Equity |
| 148 | KOSPI100 Index | Price | KRW | 900.91 | 167 | Korea KOSPI 100 Index | Domestic Equity |
| 149 | SBX Index | Price | SEK | 291.19 | 168 | The Stockholm Benchmark Index | Domestic Equity |
| 150 | BAC Equity | Price | USD | 45.73 | 170 | Bank of America Corp | Domestic Equity |

Figure 9C

COST & RISK MANAGEMENT CHANNEL

CHANGE PASSWORD | CONTACT US

TOWERS PERRIN

HOME | MONITOR | UPDATE | FORECAST | WHAT-IF | LIBRARY

▶ financial indicators ▶ asset returns

MONITOR – FINANCIAL INDICATORS

These are the leading indicators of benefit plan costs. Each indicator is a key factor in the determination of benefit liabilities and net periodic postretirement benefit costs.

All indicator values expressed as of 10 Mar 2005

XYZ Company

10 Mar 2005
select calculation date

US CPI Urban Consumers NSA (US CPI)
2.97%
US CPI Urban Consumers, all items not seasonally adjusted. Base year 1982-84=100.

▶ 000's

Citigroup 3 Month Treas Bill Y (US Cash yield)
2.47%
3 month Treasury Bill Yield

▶ FAS 87 / FAS 106

Moody's Aa Corporate Bond Index (US discount rate basis)
5.61% at 31 Oct 2004
5.63% at 10 Mar 2005
0.02% ↑ difference reflected in actuarial assumptions
The Moody's Corporate Aa Bond Index includes corporate bond issues with Aa rating, current outstandings over $100 million each, a minimum maturity of 20 years and a targeted average life of 30 years. Moody's does not include more than 1 bond issue from a particular company, and issues that Moody's deems susceptible to redemption are dropped from the index. The index yield is calculated by first determining the average yield to maturity for the industrial and utility categories, and then calculating the average of these results.

▶ download SWIFT

© 2002-2005 Towers Perrin

Figure 10

COST & RISK MANAGEMENT CHANNEL

CHANGE PASSWORD | CONTACT US

HOME | MONITOR | UPDATE | FORECAST | WHAT-IF | LIBRARY summary | plan details | all plans | calibrate

UPDATE – SUMMARY

This is the most recent update of the annual cost and policy contributions of postretirement benefit plans. It incorporates the effects of the most current economic environment.

ANNUAL COST

| measurement period ending | 31 Oct 2005 | 31 Oct 2006 |
|---|---|---|
| Cash Balance | 656 | 659 |
| Restoration | 326 | 338 |
| SERP | 332 | 343 |
| Retiree Medical | 1,522 | 1,570 |
| Retiree Life | 433 | 445 |
| Total | 3,269 | 3,355 |

POLICY CONTRIBUTION

| measurement period ending | 31 Oct 2005 | 31 Oct 2006 |
|---|---|---|
| Cash Balance | 0 | 0 |
| Restoration | 172 | 176 |
| SERP | 246 | 252 |

XYZ Company

10 Mar 2005
select calculation date

000's

FAS 87 / FAS 106 download SWIFT

© 2002-2005 Towers Perrin

TOWERS PERRIN

Figure 12

COST & RISK MANAGEMENT CHANNEL

TOWERS PERRIN

CHANGE PASSWORD | CONTACT US

HOME | MONITOR | UPDATE | FORECAST | WHAT-IF | LIBRARY summary | plan details | all plans | calibrate

UPDATE – PLAN DETAILS

This is the most recent update of the financial conditions of postretirement benefit plans. It incorporates the effects of the most current economic environment.

select plan: Cash Balance

XYZ Company

10 Mar 2005
select calculation date

'000s

FAS FINANCIAL CONDITION

| measurement on | 31 Oct 2004 | 10 Mar 2005 | 31 Oct 2005 |
|---|---|---|---|
| ABO | 8,038 | 8,121 | 8,309 |
| PBO | 9,457 | 9,613 | 9,935 |
| Fair Value of Assets | 9,930 | 10,659 | 10,608 |
| Funded Status | 473 | 1,046 | 673 |
| » Deferred Cost or (Income) | 768 | (41) | (88) |
| » Reduction to Equity | 0 | 0 | 0 |
| Additional Contributions | 0 | 0 | 0 |
| (Accrued) or Prepaid Cost | 1,241 | 1,005 | 585 |

ANNUAL COST

FAS 87 / FAS 106 download SWIFT

© 2002-2005 Towers Perrin

Figure 13

COST & RISK MANAGEMENT CHANNEL

CHANGE PASSWORD | CONTACT US

TOWERS PERRIN

| HOME | MONITOR | UPDATE | FORECAST | WHAT-IF | LIBRARY | summary ▸ plan details ▸ all plans ▸ calibrate

UPDATE — ALL PLANS

XYZ Company

10 Mar 2005
select calculation date

This is the most recent update of the financial conditions of postretirement benefit plans. It incorporates the effects of the most current economic environment.

FAS FINANCIAL CONDITION

000's

| measurement on 10 Mar 2005 | Cash Balance | Restoration | SERP | Retiree Medical | Retiree Life | Total |
|---|---|---|---|---|---|---|
| ABO | 8,121 | 1,624 | 2,319 | 0 | 0 | 12,064 |
| PBO or APBO | 9,613 | 1,923 | 2,745 | 8,564 | 2,855 | 25,700 |
| Fair Value of Assets | 10,659 | 0 | 708 | 1,771 | 0 | 13,138 |
| Funded Status | 1,046 | (1,923) | (2,037) | (6,793) | (2,855) | (12,562) |
| » Deferred Cost or (Income) | (41) | 580 | (103) | 2,447 | 298 | 3,181 |

FAS 87 / FAS 106 download SWIFT

ANNUAL COST

| measurement period ending 31 Oct 2005 | Cash Balance | Restoration | SERP | Retiree Medical | Retiree Life | Total |
|---|---|---|---|---|---|---|
| » Service Cost | 788 | 158 | 225 | 946 | 258 | 2,374 |
| Interest Cost | 565 | 113 | 161 | 509 | 168 | 1,516 |
| Expected Return on Assets | (761) | 0 | (54) | (136) | 0 | (951) |

© 2002-2005 Towers Perrin

Figure 14

COST & RISK MANAGEMENT CHANNEL

UPDATE – CALIBRATION

Choose from the following plans then press the SUBMIT button:

[SUBMIT] [CANCEL]

| Plan | Calibrate? | FVA Updated | FVA As Of | Calibrated On | Calibrated By |
|---|---|---|---|---|---|
| Cash Balance | ☐ | 10,558 | 31 Jan 2005 | 22 Feb 2005 | crmchannel@towersperrin.com |
| Restoration | ☐ | 0 | 31 Oct 2004 | 31 Oct 2004 | crmchannel@towersperrin.com |
| SERP | ☐ | 675 | 31 Oct 2004 | 31 Oct 2004 | crmchannel@towersperrin.com |
| Retiree Medical | ☐ | 1,702 | 31 Oct 2004 | 31 Oct 2004 | crmchannel@towersperrin.com |
| Retiree Life | ☐ | 0 | 31 Oct 2004 | 31 Oct 2004 | crmchannel@towersperrin.com |

Figure 15

COST & RISK MANAGEMENT CHANNEL

CHANGE PASSWORD | CONTACT US

TOWERS PERRIN

| HOME | MONITOR | UPDATE | FORECAST | WHAT-IF | LIBRARY |

☑ summary ☐ all years ☐ all plans ☐ charts

FORECAST – SUMMARY

This is a five year projection of the annual cost and policy contributions of all postretirement benefit plans. It incorporates the effects of the most current economic environment and any selected what-if scenarios.

ANNUAL COST

| measurement period ending | 31 Oct 2005 | 31 Oct 2006 | 31 Oct 2007 | 31 Oct 2008 | 31 Oct 2009 | 31 Oct 2010 |
|---|---|---|---|---|---|---|
| Cash Balance | 656 | 659 | 724 | 785 | 804 | 817 |
| Restoration | 326 | 338 | 349 | 362 | 375 | 388 |
| SERP | 332 | 343 | 355 | 368 | 381 | 394 |
| Retiree Medical | 1,522 | 1,570 | 1,627 | 1,687 | 1,750 | 1,816 |
| Retiree Life | 433 | 445 | 459 | 473 | 487 | 502 |
| Total | 3,269 | 3,355 | 3,515 | 3,674 | 3,797 | 3,918 |

POLICY CONTRIBUTIONS

| measurement period ending | 31 Oct 2005 | 31 Oct 2006 | 31 Oct 2007 | 31 Oct 2008 | 31 Oct 2009 | 31 Oct 2010 |
|---|---|---|---|---|---|---|
| Cash Balance | 0 | 0 | 0 | 597 | 771 | 658 |
| Restoration | 172 | 176 | 181 | 185 | 190 | 195 |

XYZ Company

☐ 10 Mar 2005 select calculation date

☐ 000's

☐ FAS 87 / FAS 106

☐ download SWIFT

© 2002-2005 Towers Perrin

Figure 16

COST & RISK MANAGEMENT CHANNEL

CHANGE PASSWORD | CONTACT US

HOME | MONITOR | UPDATE | FORECAST | WHAT-IF | LIBRARY
summary | all plans | charts

FORECAST – ALL YEARS

This is a five year projection of the financial conditions of all postretirement benefit plans. It incorporates the effects of the most current economic environment and any selected what-if scenarios.

select plan  Cash Balance

FAS FINANCIAL CONDITION

| measurement on | 31 Oct 2004 | 31 Oct 2005 | 31 Oct 2006 | 31 Oct 2007 | 31 Oct 2008 | 31 Oct 2009 |
|---|---|---|---|---|---|---|
| ABO | 8,038 | 8,309 | 8,623 | 8,977 | 9,375 | 9,822 |
| PBO | 9,457 | 9,935 | 10,449 | 11,000 | 11,588 | 12,216 |
| Fair Value of Assets | 9,930 | 10,608 | 10,538 | 10,439 | 10,915 | 11,588 |
| Funded Status | 473 | 673 | 89 | (561) | (673) | (629) |
| * Deferred Cost or (Income) | 768 | (88) | (162) | (237) | (313) | (389) |
| * Reduction to Equity | 0 | 0 | 0 | 0 | 0 | 0 |
| Additional Contributions | 0 | 0 | (74) | (798) | (986) | (1,018) |
| (Accrued) or Prepaid Cost | 1,241 | 585 | | | | |

XYZ Company

10 Mar 2005
select calculation date

000's

FAS 87 / FAS 106 download SWIFT

© 2002-2005 Towers Perrin

TOWERS PERRIN

Figure 17

COST & RISK MANAGEMENT CHANNEL

HOME | MONITOR | UPDATE | FORECAST | WHAT-IF | LIBRARY summary | all years | all plans | charts

XYZ Company

10 Mar 2005
select calculation date

000's

FAS 87 / FAS 106 download SWIFT

© 2002-2005 Towers Perrin

ANNUAL CASH FLOW

| measurement period ending 31 Oct 2005 | Cash Balance | Restoration | SERP | Retiree Medical | Retiree Life | Total |
|---|---|---|---|---|---|---|
| Policy Contribution | 0 | 172 | 246 | 1,216 | 355 | 1,988 |
| Benefit Payments | 860 | 172 | 246 | 1,216 | 355 | 2,848 |

ERISA FINANCIAL CONDITION

| measurement on 1 Jan 2005 | Cash Balance | Restoration | SERP | Retiree Medical | Retiree Life | Total |
|---|---|---|---|---|---|---|
| AAL | 9,275 | 0 | 0 | 0 | 0 | 9,275 |
| Actuarial Value of Assets | 10,058 | 0 | 0 | 0 | 0 | 10,058 |
| AAL Funded Status | 783 | 0 | 0 | 0 | 0 | 783 |
| CL | 9,275 | 0 | 0 | 0 | 0 | 9,275 |
| Actuarial Value of Assets | 10,058 | 0 | 0 | 0 | 0 | 10,058 |
| CL Funded Ratio | 108% | 0% | 0% | 0% | 0% | 108% |

ERISA CASH FLOW

| plan year beginning 1 Jan 2005 | Cash Balance | Restoration | SERP | Retiree Medical | Retiree Life | Total |
|---|---|---|---|---|---|---|

TOWERS PERRIN

ESTIMATING FINANCIAL VALUATION OF BENEFIT PLANS

RELATED PATENT APPLICATION

This application claims priority to U.S. Provisional Patent Application No. 60/575,494, filed May 28, 2004 and entitled "Method and System for Cost and Risk Management." The subject matter of the priority application identified above is hereby fully incorporated herein by reference.

FIELD OF THE INVENTION

The present invention relates to financial management of benefit plans. Particularly, the present invention relates to providing intra-year benefit plan financial valuations for managing benefit plans between annual actuarial valuations.

BACKGROUND OF THE INVENTION

Post-retirement benefit plans comprise pension and retiree welfare plans. Representative examples of pension plans comprise plans subject to the federal Employee Retirement Income Security Act ("ERISA"), restoration pension plans, and supplemental executive retirement plans ("SERPs"). Representative examples of retiree welfare plans comprise medical and life (death benefit) plans. Such postretirement benefit plans are hereinafter collectively referred to as "benefit plans". Benefit plans typically comprise a promise to pay future benefits in return for present day service. An actuarial valuation of a benefit plan provides a present day cost for those future liabilities. Actual actuarial valuations typically require much time and expense to create and provide only a snapshot of a benefit plan's financial status on the valuation date. A company relies on the actuarial valuation to determine its compliance with laws related to benefit plans and its funding requirements for the next budget year.

Conventionally, actuarial valuations are performed annually, and a company does not change its benefit plan budgets or forecasts until the next actuarial valuation is performed. However, if the equity markets decrease in value, then benefit plans can become under-funded. Nevertheless, companies are reluctant to order a new actuarial valuation between annual valuations because of the significant expense involved. Additionally, because the annual valuations require several weeks or more to research and prepare, a company cannot order an actuarial valuation to obtain current information for an urgent business. Accordingly, companies typically "make do" with their annual actuarial valuation even if that valuation is several months old.

Furthermore, without any current financial status information available, the client cannot evaluate hypothetical changes in capital market data or other benefit plan assumptions based on the current financial status of a benefit plan. Any such conventional hypothetical forecasts have been based on the annual actuarial valuation, which can be up to twelve months old. Those conventional hypothetical forecasts typically cannot provide an accurate financial valuation forecast because they are based on outdated underlying information.

Accordingly, a need exists in the actuarial arts for a system and method for efficiently updating benefit plan financial valuations during an intra-year time period between annual actuarial valuations. A further need exists in the art for calibrating benefit plan financial valuations to actual plan data achieved during the intra-year time period and for basing future financial valuation updates on the calibrated data. A need also exists for providing hypothetical analysis of theoretical benefit plan scenarios based on the updated and/or calibrated financial valuations.

SUMMARY OF THE INVENTION

The present invention can provide a system and method for efficiently updating benefit plan financial valuations during an intra-year time period between annual actuarial valuations. Generic capital market data can be collected during the intra-year time period and as often as each working day. Components of the generic capital market data relevant to a particular client's benefit plan can be converted into data specific to that client based on actuarial assumptions applicable to the valuation of the client's benefit plan. Then, a calculation engine can calculate an updated financial valuation for the benefit plan based on the intra-year client-specific data and rules established for valuing the benefit plan.

The present invention also can allow a client to calibrate assumptions or other proxies used in the calculation engine to actual data obtained since the previous annual actuarial valuation. The client can input the actual data, which can replace client-specific capital market or other data for use in the calculation engine's updating process. Then, the financial valuation of the client's benefit plan can be updated based on the actual data and unchanged intra-year client-specific data. The calculation engine can access those data elements and can calculate an updated financial valuation for the benefit plan based on that data and the rules established for valuing the benefit plan.

Additionally, the present invention can allow a client to input hypothetical benefit plan scenarios to evaluate the financial valuation of a benefit plan under those scenarios. The hypothetical financial valuation can be based on the intra-year updated financial information and/or the actual client data to which the plan's performance has been calibrated. The client can change that data to reflect hypothetical desired or expected results. The calculation engine can calculate a forecast financial valuation for the benefit plan based on the hypothetical data, unchanged intra-year client-specific data, unchanged actual client-specific data, and rules established for valuing the benefit plan.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

FIG. 8 is a table listing representative exchange rate financial information relevant to benefit plan financial valuation according to an exemplary embodiment of the present invention.

FIGS. 9A-9C are a table listing representative capital market indices of financial information relevant to benefit plan financial valuation according to an exemplary embodiment of the present invention.

FIG. 10 illustrates a representative client user interface for presenting intra-year financial indicators of costs for a client's benefit plans according to an exemplary embodiment of the present invention.

FIG. 12 illustrates a representative client user interface for presenting a summary of intra-year updated annual costs and policy contributions of a client's benefit plans according to an exemplary embodiment of the present invention.

FIG. 13 illustrates a representative client user interface for presenting details of an intra-year updated financial condition of a client's benefit plan according to an exemplary embodiment of the present invention.

FIG. 14 illustrates a representative client user interface for presenting details of an intra-year updated financial condition of a client's multiple benefit plans according to an exemplary embodiment of the present invention.

FIG. 15 illustrates a representative client user interface for requesting an intra-year calibration function for a client's benefit plan according to an exemplary embodiment of the present invention.

FIG. 16 illustrates a representative client user interface for presenting an intra-year summary forecast of costs and policy contributions of a client's benefit plans according to an exemplary embodiment of the present invention.

FIG. 17 illustrates a representative client user interface for presenting details of an intra-year forecasted financial condition of a client's benefit plan according to an exemplary embodiment of the present invention.

FIG. 18 illustrates a representative client user interface for presenting details of an intra-year forecasted financial condition of a client's multiple benefit plans according to an exemplary embodiment of the present invention.

FIG. 19 illustrates a representative client user interface for inputting hypothetical data for a benefit plan for use in a hypothetical financial valuation according to an exemplary embodiment of the present invention.

DETAILED DESCRIPTION OF EXEMPLARY EMBODIMENTS

Figure 1:
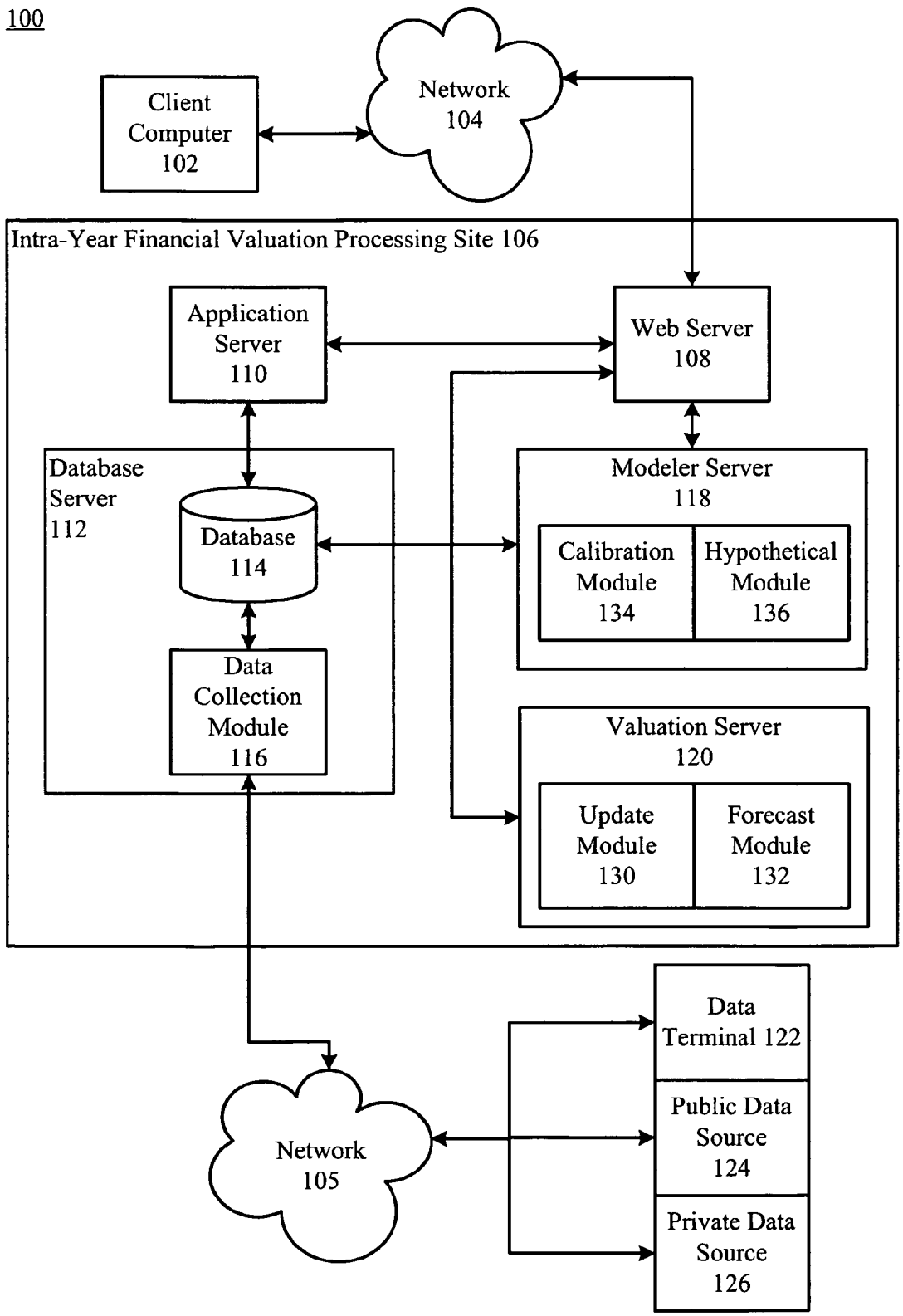
FIG. 1 is a block diagram depicting a system for intra-year financial valuation according to an exemplary embodiment of the present invention.

The present invention can provide a system and method for intra-year financial valuation of post-retirement benefit plans. Such intra-year valuations can supplement a company's annual actuarial valuation of its benefit plans. The intra-year financial valuations can allow a company to treat its benefit plans like it treats its business. The intra-year valuations can allow the company to handle benefit plan issues as they happen instead of waiting for the next annual actuarial valuation to revise its budget and corresponding funding requirements. A company can plan for changing benefit plan liabilities as they happen based on the intra-year valuations, thereby allowing the company to be more proactive in handling its future budget shortfalls.

The annual actuarial valuations have previously provided an acceptable, although short-sighted, business model because those valuations provided a reasonable value upon which to base budget forecasts. If capital market interest rates dropped, asset values typically would increase to balance the overall value. Similarly, if asset values dropped, interest rates may have been rising to balance the overall value. However, recent market declines have provided an unusual affect on benefit plan valuations. Interest rates and asset values both declined, thereby resulting in extreme under-finding of benefit plan liabilities. An outdated annual actuarial valuation could not be used to allow a company to begin budgeting for the following year to cover the increased benefit plan liabilities because those companies did not have any estimate of those increased liabilities. Accordingly, the present invention was developed to provide an updated benefit plan financial valuation that can be current on any working day of the year. A company can rely on the updated financial valuation to budget for its future benefit plan liabilities.

To effectively manage benefit plans requires a determination of their current and forecasted financial status at any point in time during the year. Such status involves taking annual valuation results, which may be out of date by at least several months, and performing a series of adjustments to reflect events that have transpired up to the current date. The most significant adjustments ordinarily are related to capital market outcomes, which can dramatically affect the financial status of benefit plans. Other, less systematic events, such as workforce changes and contract negotiations, also can cause a material impact in the financial status of benefit plans.

The present invention can provide benefits derived from updated data collection, filtering, calibrating, hypothesizing, and forecasting tasks. Current information for client-specific benefit plan monitoring and decision-making can be provided. Additionally, a greater amount of information can be gathered and analyzed than is possible with conventional methods, which can improve the analytical quality of estimating benefit plan financial values.

The present invention comprises a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

An exemplary embodiment of the present invention comprises a computer-implemented system and method that can estimate the current and forecasted financial status of a benefit plan based on access to a system that is updated with current financial information, such as capital market data.

The system can be implemented in an on-line environment comprising a central computing and storage facility and multiple users that can access the central computing and storage facility via client computers coupled to a distributed computer network, such as the global Internet. A user operating a client computer with a browser can log-in to a web site supported by the central computing and storage facility and initiate a secure communication for benefit plan management operations. The central computing and storage facility calculates an updated financial status of a benefit plan based on instructions and/or data received from the client computer, benefit plan and financial information stored in the data storage function, and processing operations completed by the computing function.

According to an exemplary embodiment, the central computing and storage system can be implemented by one or more computing systems, such as a web server, an application server, and a central data store comprising one or more databases. The web server provides the on-line interface for client computers that access the central computing and storage system. The application server typically houses one or more application programs for processing data stored by the central data store and/or input by a user via the on-line interface provided by the web server. Those skilled in the art will appreciate that the architecture for the central computing and storage facility can be implemented by alternative computing and data storage configurations and that the scope of the innovative system is not limited to a particular computing or storage configuration.

Financial information relevant to the valuation of a benefit plan can comprise a variety of capital market data, including but not limited to, yields on fixed income securities, returns on asset classes around the world, inflation in various regions, wage levels, other economic and labor statistics, and currency exchange rates. This financial information is preferably global in scope and represents financial data for the United States and relevant foreign markets. FIGS. 8 and 9A-9C list exemplary financial information that can be relevant to benefit plan valuation. FIG. 8 is a table listing representative exchange rate financial information relevant to benefit plan financial valuation according to an exemplary embodiment of the present invention. FIGS. 9A-9C are a table listing representative capital market indices of financial information relevant to benefit plan financial valuation according to an exemplary embodiment of the present invention.

The system collects financial information on an intra-year basis. The financial information can be relevant to the valuation of benefit plans, such as capital market data. As used herein, the term "intra-year" means during the time period between conventional, actuarial benefit plan valuations for a particular client. Typically, clients obtain an annual actuarial valuation for its benefit plans. In that case, "intra-year" is a time between the annual actuarial valuations. In alternative exemplary embodiments, intra-year financial information can be collected on a periodic, predefined, irregular, or other suitable basis between conventional actuarial valuations. The financial information can be collected from a variety of public and private data sources. For example, the system can collect capital market data on a daily basis from data stores coupled to one or more distributed computer networks, such as a local area network, a wide area network, the global Internet, a dedicated connection, or other suitable network.

According to an exemplary embodiment, the system uses automated data collection processes to collect and house the capital market data in the central data store to create a repository of up-to-date financial information. For example, a computing system can poll a data source to obtain desired updated financial information, or a data source can download updated financial information to the central data store on a scheduled or known basis. Financial information-related data sources can include proprietary databases, publicly available databases, custom databases located in multiple geographical locations, and other conventional forms of data repositories. These exemplary automated data collection processes can be supplemented, where required, by manual data collection processes to permit the collection of desired financial information from certain data sources, such as printed publications that do not readily support an automated data retrieval function. In an exemplary embodiment, the public, private, and manual data sources can provide the representative financial information listed in the tables of FIGS. 8 and 9A-9B.

Because the financial information is obtained from a variety of data sources, each possibly having a different data format, the system can be programmed to convert a particular format of collected data to a common format adopted for financial information stored in the central data store. This updated financial information is collected and maintained as records in the central data store and is available for subsequent benefit plan-related calculations.

The system can determine the impact of the updated financial information, including various capital market data items, for a selected benefit plan based on the specific characteristics of that plan. For example, certain capital markets indices may be applicable to the asset allocation for a pension plan, while other indices are not relevant to the valuations of the assets maintained by that pension plan. Each variable may have an effect on one or more plans. Similarly, a given plan may be affected by a unique combination of variables. In essence, relevant updated financial information, as obtained and maintained by the central data store, is applied to the pension plan-in-issue in accordance with a predetermined rule set. This application of the updated financial information to a particular pension plan may result in a filtering of the data set maintained by the central data store to present a subset of updated financial information relevant to the pension plan-in-issue.

Appropriate rules are established to support updates for each benefit plan. Based on an application of these rules, the system automates an updated valuation of benefit data based on plan-specific updates to the financial information. For example, the asset allocation policy of a funded benefit plan can be described by rules specifying the target allocation to each available asset class in the central data store. Benchmark returns would then be developed by formula. Another set of rules might determine how a plan sponsor's actuarial assumptions might change over time. These rules can specify the capital market indices in reference to which each assumption was set, the index change necessary to trigger an assumption change, and the degree to which the assumption was adjusted. Additional parameters can specify the reporting currency for the plan sponsor and the local currency for each plan so that the appropriate currency conversions can be performed. A client-specific calculation engine can be developed based on the rules established for the client. Then, updated financial information, experience, and/or actual client data can be input into the calculation engine to provide an updated financial valuation for the client's benefit plan.

In an exemplary embodiment, a client-specific calculation engine can be developed for each of multiple benefit plans for each client. Accordingly, a particular client can have multiple calculation engines developed specifically for respective plans. For example, a client may have a U.S. benefit plan and one or more foreign benefit plans. Additionally, a client may have multiple plans within a single country. For example, a client may need different types of plans (i.e., one qualified, one restoration, and one SERP). Separate pension plans can serve separate constituents, such as hourly employees versus salaried employees or employees of separate lines of business. Accordingly, a calculation engine can be developed for each plan, and the financial valuation of each plan can be updated anytime during the intra-year period.

One specific and unique aspect of calculations supported by the system is called "asset calibration." It will be appreciated that actual investment performance will not perfectly track that of the benchmarks. This divergence can come from a variety of sources, such as asset allocations that vary over time, tracking error of individual managers, various fees and expenses, etc. Whenever information about the actual return and cash flows of the trust becomes available, a user can "true-up" or calibrate the calculations supported by the system to match that information. This asset calibration task involves entering the trust asset value on any date, along with the contributions and payments that led up to that date, for processing by the system. In turn, the system can determine the actual return that is implied by this data and can utilize it in subsequent calculations. Benchmark returns can be used to advance assets beyond the date of the last calibration.

The system also can calculate the plan's current and forecasted financial status in light of all available information. These complex calculations can be completed in a separate application program, typically a financial calculation tool or engine, invoked by the system. This step also provides an opportunity for further calibration to reflect factors unrelated to capital market data. Such factors might include changes to the provisions of the benefit plan, or to the demographic characteristics of the covered population. Since the nature and impact of these events are specific to each situation, the resulting adjustments are implemented by directly modifying the calculations within this financial calculation tool module.

According to an exemplary embodiment, the financial valuation calculation tool can comprise an electronic spreadsheet designed to operate flexibly and efficiently within the process and data flow of the system. For example, this financial calculation tool can be programmed for a benefit plan of a particular company in several different ways, depending on the complexity of the relevant benefit plans, the materiality of their results on the company, and the availability of data. In some cases, the financial calculation tool can utilize simplified versions of the calculations based on information published in publicly available financial statements, such as SEC reports, for example, 10-K reports. In other cases, the financial calculation tool can use more complex alternative calculations that incorporate additional rigor and require more input data. To further improve efficiency in situations when the valuation services are performed by a consulting firm, much of the data required by this application can be populated automatically by the financial valuation calculation tool used to perform the valuation. Because alternative calculation approaches are available, tailored for maximum effectiveness in different situations, the financial calculation tool can be set-up for each benefit plan with great efficiency.

The system can present the results of the calculation and calibration tasks to interested parties with authorized access to the system. In exemplary embodiments, the interested parties can comprise a consulting service provider, the plan sponsor, human resources manager, chief financial officer, investment manager, or other party interested in the financial valuation of the benefit plan. This presentation can be via a user interface integral to the system or via another system to which the system passes information.

Thus, the processing site 106 can be updated daily with current financial indicators to reflect the impact of a changing economic environment. Updated financial indicators and benchmark assets can be tracked by the processing site 106 to develop a new set of actuarial assumptions and appropriate estimates of asset values for each workday. The processing site 106 can use those inputs to calculate the current financial condition of each benefit plan and to project its annual cost for the next five or more fiscal years. Financial indicators can include economic indices that guide the selection of actuarial assumptions and certain measures of changes in cost of living. For each country, a key bond index can be used to determine the change in actuarial assumptions from the beginning of the fiscal year. New actuarial assumptions can be set according to policy factors appropriate for each assumption. For example, a plan's discount rate could change by one hundred percent of the change in the key bond index, but other assumptions, such as the salary scale, could change by only fifty percent of the change in the key bond index. Similarly, consumer price index and other economic measures can serve as indicators towards setting proper assumptions for compensation increases, cash balance interest crediting rates, cost-of-living adjustments and health care cost trend rates. Additionally, more precise representations of assumption-setting policy, such as rounding or applying floors (minima), ceilings (maxima), or other plan-specific features can be programmed as necessary.

Referring to the drawings, in which like numerals represent like elements, aspects of the exemplary embodiments will be described.

FIG. 1 is a block diagram depicting a system 100 for intra-year financial valuation according to an exemplary embodiment of the present invention. As illustrated, the system 100 comprises an intra-year financial valuation processing site 106. A client can access the processing site 106 via a client computer 102 coupled to the processing site 106 via a distributed computing network 104. According to exemplary embodiments, the network 104 can comprise the Internet, a local area network, a wide area network, a dedicated communication link, or other suitable network. The client computer 102 communicates via the network 104 with a web server 108 at the processing site 106. The web server 108 controls communications between the processing site 106 and the client computer 102. An application server 110 controls the web pages presented via the web server 108.

At the processing site 106, a database server 112 comprises a database 114 and a data collection module 116. The database 114 stores client assumptions and other financial valuation data that supports intra-year financial valuations of benefit plans for multiple clients. The data collection module 116 receives the financial valuation data from one or more of a data terminal 122, a public data source 124, and a private data source 126 via a network 105. The data collection module 116 then inputs the financial valuation data into the database 114 to support intra-year financial valuations of benefit plans. The database 114 also stores financial valuation data received from the web server 108, a modeler server 118, and a valuation server 120. According to exemplary embodiments, the network 104 can comprise the Internet, a local area network, a wide area network, a dedicated communication link, or other suitable network.

In an exemplary embodiment, the data collection module 116 collects updated capital market data one or more times during an intra-year time period and stores the "intra-year" updated capital market data in the database 114. In an exemplary embodiment, the intra-year updated capital market data can comprise generic data, such as currency exchange rates and financial indices, received from one or more of the data terminal 122, the public data source 124, and the private data source 126.

An update module 130 converts the generic data into client-specific data relevant to particular benefit plans of client's. The update module 130 identifies components of the intra-year capital market data that are relevant to specific benefit plans of particular clients. The update module 130 then converts those relevant components for each particular client into "intra-year" client-specific data based on the respective client's financial valuation assumptions stored in the database 114. Client-specific data stored in the database 114 also can be updated based on "experience" data that reflects actual occurrences that were different from assumptions used in the annual actuarial valuation. For example, the salary scale can be updated based on experience showing a 2.5% scale actually experienced since an annual valuation that was based on a 3.0% scale assumption.

The update module 130 performs intra-year financial valuation updates for each benefit plan of the clients with records stored in the database 114. The update module 130 accesses the database 114 and retrieves the intra-year client-specific data relevant to a client and updates that client's financial valuation based on that intra-year client-specific data. The update module can input the intra-year client-specific data into a calculation engine developed for the particular client's benefit plan to perform the updated financial valuation. The update module 130 then stores the intra-year updated financial valuation in the database 114. The update module 130 can repeat that process for each benefit plan of the multiple clients.

A client can request an updated financial valuation at any time during the intra-year period by communicating a request from the client computer 102 to the web server 108 via the network 104. The web server 108 retrieves the intra-year updated financial valuation from the database 114 and communicates the intra-year updated financial valuation to the client computer via the network 104. The client computer 102 presents the intra-year updated financial valuation to the client.

A forecast module 132 can provide an updated financial valuation forecast for one or multiple years based on the intra-year updated financial valuation. For example, the forecast module 132 can provide a five-year forecast for the updated financial valuation. In an exemplary embodiment, the first year can be forecast to the date of the client's next annual actuarial valuation, with subsequent year forecasts provided on the annual due date of the actuarial valuation.

When the client obtains actual financial data, the client can calibrate its financial valuation based on that actual data. To perform the calibration function, the client inputs the actual client-specific data into the client computer 102, which communicates that data via the network 104 to the web server 108. The web server 108 communicates the actual client-specific data to a calibration module 134. Then, the calibration module 134 replaces annual or intra-year client-specific data in the database 114 with the actual client-specific data input by the client. The update module 130 then updates the client's financial valuation based on the actual client-specific data and unchanged components of annual or intra-year client-specific data. Additionally, the forecast module 132 can update the client's forecast financial valuation based on the same information. Subsequent valuation updates and forecasts can be based on the calibrated information. In an exemplary embodiment, the client can input actual values for one or more of the following data items to calibrate a benefit plan valuation: fair market value of assets, benefit payments paid during any month of the year, employer contributions paid (or scheduled to be paid) at any point during the year, employee contributions paid during any month of the year, or another suitable item relevant to the financial valuation of the benefit plan.

The client also can input hypothetical financial data to obtain hypothetical financial valuation forecasts. To perform the hypothetical financial valuation function, the client accesses the web server 108 via the network 104 and client computer 102 and requests a hypothetical financial valuation. The web server 108 communicates that request to a hypothetical valuation module 136, which retrieves a full set of intra-year and annual client-specific data for the client and communicates that data to the client computer 102 via the web server 108 and the network 104. The client computer 102 presents the full set of data to the client. Then, the client can input hypothetical data into the client computer 102 to change one or more of the components of the full set of intra-year or annual client-specific data, and the client computer 102 communicates the changed (hypothetical) data to the web server 108 via the network 104. The web server 108 communicates the changed (hypothetical) data to the hypothetical module 136, which inputs the hypothetical data into the database 114. Then, the forecast module 132 reads the hypothetical data and unchanged intra-year capital market data and/or unchanged annual data for the client from the database 114 and generates a hypothetical forecast of the financial valuation based on that data. The forecast can cover one or multiple years, as discussed previously.

Accordingly, the data collection, update, forecast, calibrate, and hypothetical functions can be performed in real time, thereby providing an estimate of a benefit plans financial valuation that can be accurate on any day between annual actuarial valuations.

Figure 2:
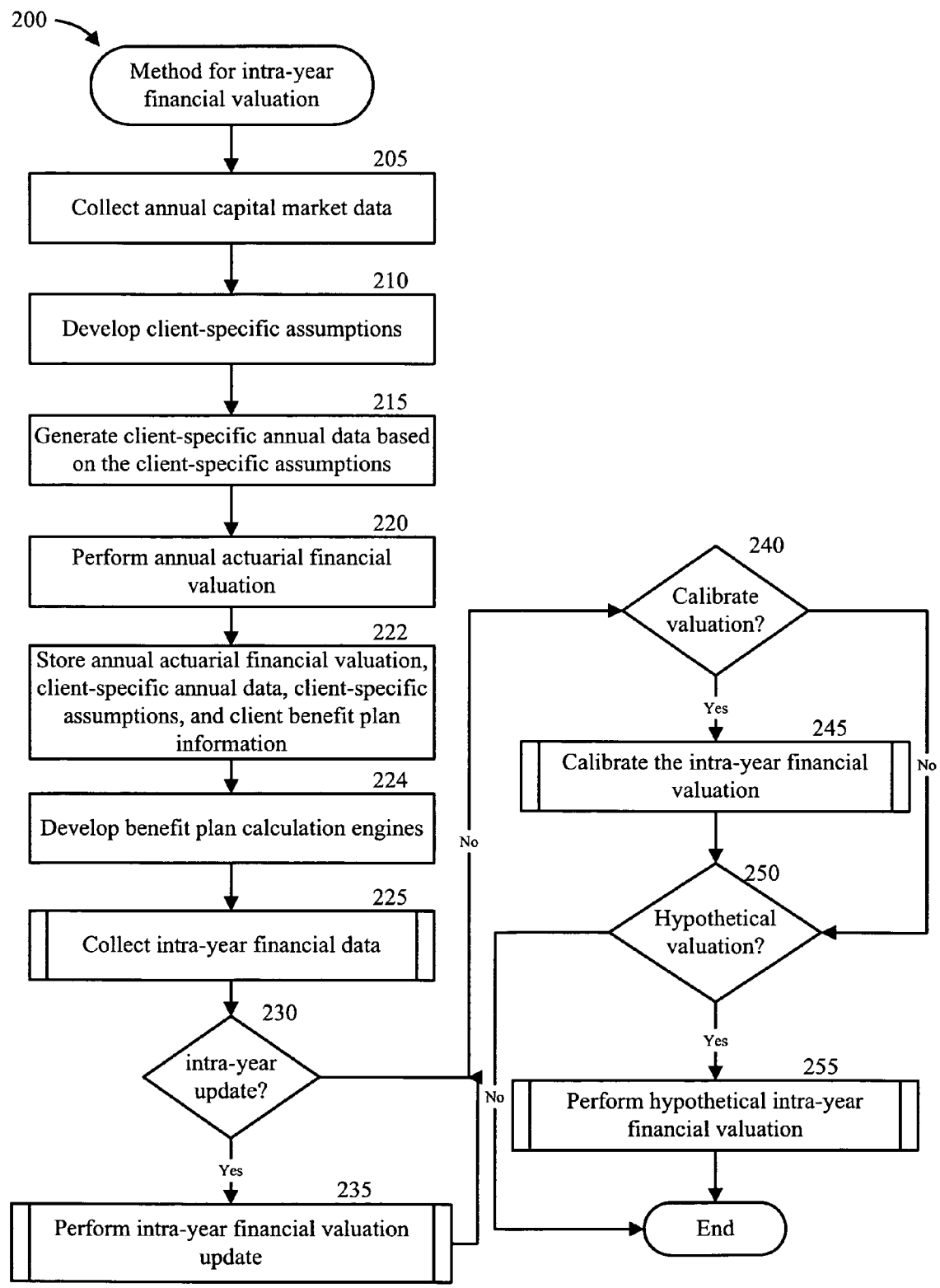
FIG. 2 is a flow chart depicting a method for intra-year financial valuation according to an exemplary embodiment of the present invention.

Exemplary processes performed by the system 100 will be described with reference to FIGS. 2-7. FIG. 2 is a flow chart depicting a method 200 for intra-year financial valuation according to an exemplary embodiment of the present invention. The method 200 will be described with reference to FIGS. 1 and 2.

Steps 205-220 illustrated in FIG. 2 describe steps for performing an annual actuarial financial valuation. In step 205, annual capital market data relevant to financial valuations is collected. In step 210, client-specific assumptions are developed for each client benefit plan for which an annual actuarial financial valuation will be performed. The client-specific assumptions define the rules by which a specific client applies capital market data as part of the actuarial valuation of its benefit plans.

In step 215, annual client-specific data is generated based on the client-specific assumptions. In that regard, the client-specific assumptions are applied to the annual capital market data to develop the annual client-specific data. Then, in step 220, an annual actuarial financial valuation is performed based on the annual client-specific data and the client's annual benefit plan data for a particular benefit plan. The client's annual benefit plan data can comprise information relevant to the particular benefit plan and collected for the annual actuarial valuation. For example, the annual benefit plan data can comprise demographic data (e.g., a current profile of each person covered by the benefit plan), cost information (e.g., provider costs, co-pays, benefit payments estimates, and contribution estimates), and other information that impacts the financial value of the benefit plan.

In step 222, information regarding the annual financial valuation, annual client-specific data, client-specific assumptions, and annual client benefit plan data are input into the database 114 via the data collection module 122. In alternative exemplary embodiments, that information can be input into the database 114 manually, or the data collection module 116 can passively or actively collect that information.

In step 224, a calculation engine is developed for each client benefit plan for calculating updated financial valuations, including forecasts, calibrations, and hypothetical analysis, based on client-specific data, client-specific assumptions, and client benefit plan data.

In step 225, intra-year financial data is collected and stored in the database 114. Step 225 will be discussed in further detail hereinafter with reference to FIG. 3.

In step 230, the method 200 determines whether to perform an intra-year financial valuation update. The method 200 can make that determination based on input received from a user via the client computer 102 and the network 104. For example, if the user selects an intra-year update option, then the method 200 determines that the user desires an intra-year financial valuation update. In that case, the method branches to step 235.

In step 235, an intra-year financial valuation update is performed. Step 235 will be discussed in further detail hereinafter with reference to FIG. 5. The method then proceeds to step 240. Referring back to step 230, if the method 200 determines that an intra-year financial valuation update is not desired, then the method can branch directly to step 240.

In step 240, the method 200 determines whether to calibrate an intra-year financial valuation. The method 200 can make that determination based on input received from the user via the client computer 102. For example, the user can select a calibration function via the client computer 102, and the client computer 102 can communicate that request to the web server 108 via the network 104. If the method 200 determines in step 240 to perform a calibration function, then the method branches to step 245.

In step 245, the intra-year financial valuation is calibrated based on actual client-specific data. Step 245 will be discussed in further detail hereinafter with reference to FIG. 6. The method then proceeds to step 250. Referring back to step 240, if the method 200 determines that the calibration function is not desired, then the method can branch directly to step 250.

In step 250, the method 200 determines whether to perform a hypothetical valuation. The method 200 can make that determination based on input received from the user via the client computer 102. For example, the user can select a hypothetical function via the client computer 102. Then, the client computer 102 can communicate that request to the processing site 106 via the network 104. If the method 200 determines in step 250 to perform a hypothetical valuation, then the method branches to step 255.

In step 255, a hypothetical financial valuation is performed. Step 255 will be discussed in further detail hereinafter with reference to FIG. 7. The method then ends. Referring back to step 250, if the method 200 determines that a hypothetical valuation is not desired, then the method can branch directly to the end.

Figure 3:
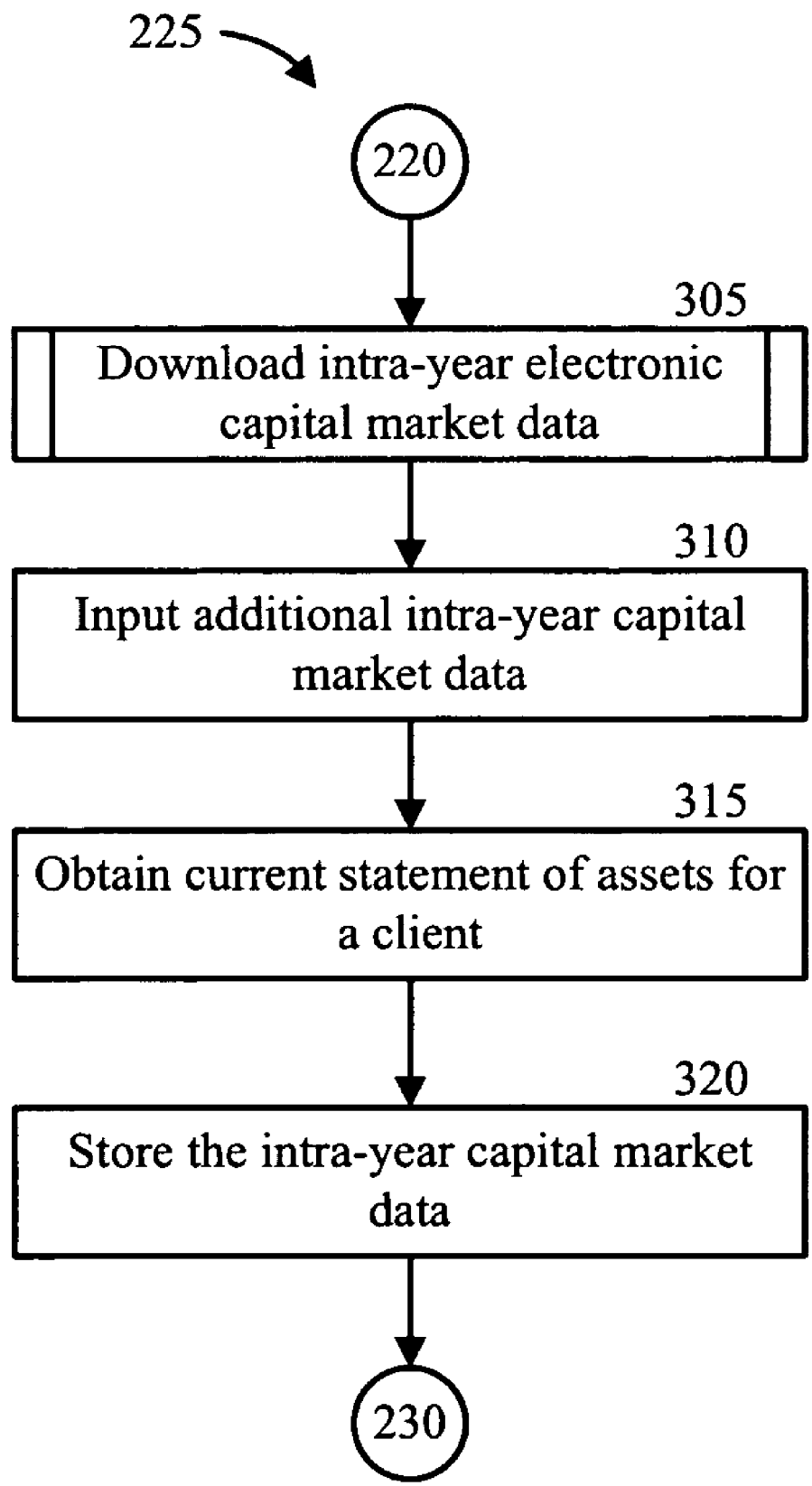
FIG. 3 is a flow chart depicting a method for collecting intra-year financial data according to an exemplary embodiment of the present invention.

FIG. 3 is a flow chart depicting a method 225 for collecting intra-year financial data according to an exemplary embodiment of the present invention, as referred to in step 225 of FIG. 2. The method 225 will be described with reference to FIGS. 1 and 3.

In step 305, the data collection module 116 downloads intra-year electronic capital market data. Step 305 will be discussed in further detail hereinafter with reference to FIG. 4.

In step 310, a statistician, database manager, analyst, or other user can input additional intra-year capital market data via the data terminal 122. The user can input the additional intra-year capital market data into the data terminal 122, which can communicate that data via the network 105 to the data collection module 116. In an exemplary embodiment, the additional capital market data can comprise data that is not readily available in electronic form.

In step 315, the user can obtain a current statement of assets for a client and can input that information in a manner similar to inputting the additional intra-year capital market data. In an exemplary embodiment, the user can obtain the current statement of assets directly from the client. Alternatively, the user can obtain a current statement of assets by calculating the current value based on current capital market data.

In step 320, the data collection module 116 stores the intra-year capital market data received in steps 305-315 in the database 114 for use in intra-year financial valuation functions. The method then proceeds to step 230 (FIG. 2).

Figure 4:
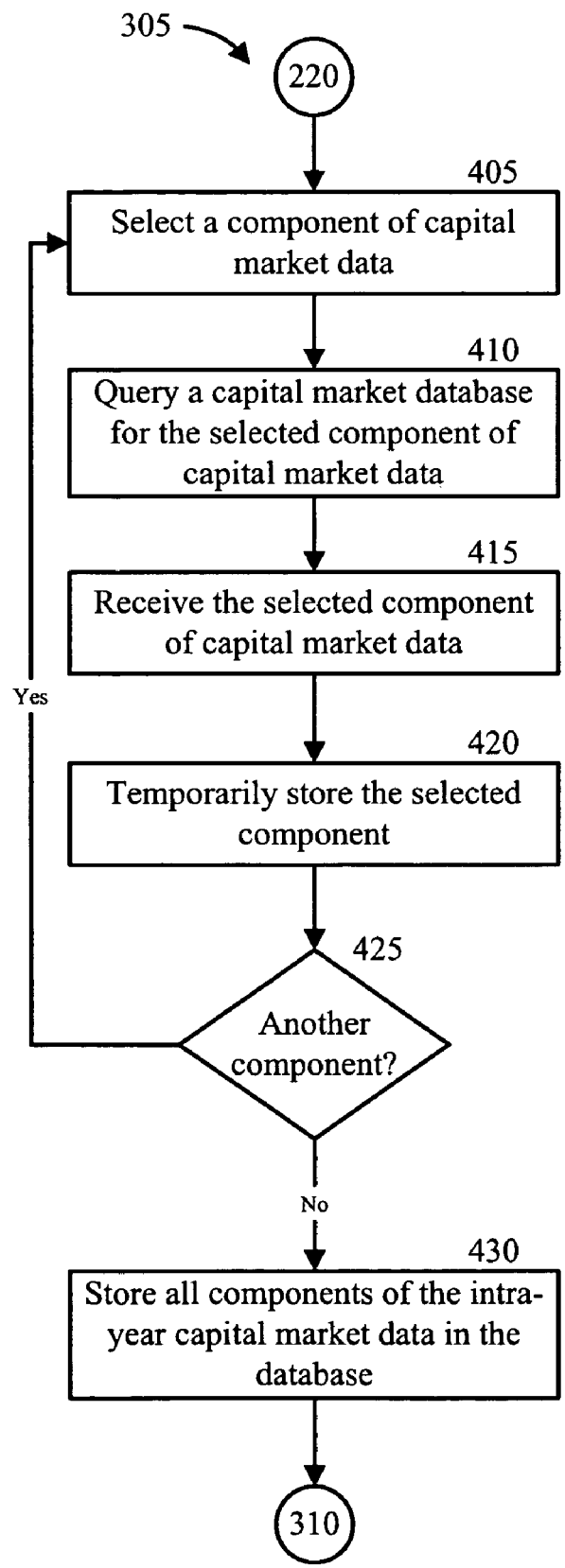
FIG. 4 is a flow chart depicting a method for downloading intra-year electronic capital market data according to an exemplary embodiment of the present invention.

FIG. 4 is a flow chart depicting a method 305 for downloading intra-year electronic capital market data according to an exemplary embodiment of the present invention, as referred to in step 305 of FIG. 3. The method 305 will be discussed with reference to FIGS. 1 and 4.

In step 405, a particular component of capital market data is selected. In an exemplary embodiment, an electronic spreadsheet can comprise a list of desired capital market data components and one or more macros that operate to select and obtain the desired components. In that case, the macro can operate to identify the first desired component of electronic capital market data in the list in step 405.

In step 410, a capital market database is queried for the selected component of capital market data. In an exemplary embodiment, the capital market database can comprise the public data source 124 or the private data source 126. According to another exemplary embodiment, a spreadsheet macro can initiate a query to the capital market database to request the selected component of capital market data.

In step 415, the selected component of capital market data is received from the capital market database in response to the query initiated in step 410. Then, in step 420, the selected component of capital market data is stored temporarily until other components of capital market data have been obtained.

In step 425, the method 305 determines whether to obtain another component of capital market data. If yes, then the method 305 branches back to step 405 to download additional components of capital market data. If not, then the method branches to step 430. In step 430, the data collection module 116 stores all of the components of the intra-year capital market data in the database 114. The method then proceeds to step 310 (FIG. 3).

In an exemplary embodiment, the components of capital market data can be downloaded onto a storage medium at the data terminal 122. For example, a user can insert a storage medium into the data terminal 122. The storage medium can comprise a spreadsheet application comprising fields for each respective component of capital market data. The spreadsheet application also can comprise one or more macros associated with the components of capital market data. The macros can identify components of capital market data and can initiate database queries to retrieve those components. Accordingly, referring back to the method 305, the spreadsheet application can select a particular component of capital market data based on the component fields in the spreadsheet. Then, a macro associated with the spreadsheet can generate a query to the capital market database for a particular component of capital market data. When the spreadsheet application receives a particular component of capital market data from the capital market database, the macro can instruct the spreadsheet application to store the particular component in the respective field of the spreadsheet. After all of the particular components of capital market data have been retrieved from the database and stored in respective fields of the spreadsheet, the data can be communicated to the data collection module 116, which can store all components of the intra-year capital market data in the database 114. In an exemplary embodiment, all of the components of the intra-year capital market data can be communicated from the data terminal 122 to the data collection module 116 via the network 105. Alternatively, the storage medium comprising the components of capital market data can be removed from the data terminal 122 and placed into the data collection module 116 to communicate the components of intra-year capital market data.

In an alternative exemplary embodiment, the data collection module 116 can download the particular components of capital market data directly from the capital market databases via the network 105. In another alternative exemplary embodiment, the data collection module 116 can comprise a storage medium and can download the particular components of capital market data in a manner similar to the download procedure performed via the data terminal 122.

In an exemplary embodiment, the capital market database can comprise the public data source 124 or the private data source 126. Alternatively, or additionally, components of intra-year capital market data can be manually input into the spreadsheet application via the data terminal 122. In that case, the capital market database can be external to the system, and data can be manually retrieved and input into the data terminal 122. According to an exemplary embodiment, the private data source 126 can comprise a subscription-based financial database. For example, the private data source 126 can comprise a direct feed from a provider of financial information, such as Bloomberg. Alternatively, the private data source 126 can comprise an actuary or other financial or investment analyst, particularly in foreign countries. The analyst can provide capital market data to the user, who can input the capital market data into the data terminal 122. The public data source 124 can comprise an information source that is available without a subscription. For example, the public data source 124 can comprise iBoxx Euro and iBoxx Sterling All Stock funds (not available via Bloomberg) or discount rate suggestions from local actuaries in countries with peculiar financial markets, such hyperinflation in Brazil or extremely low discount rates in Japan.

Figure 5:
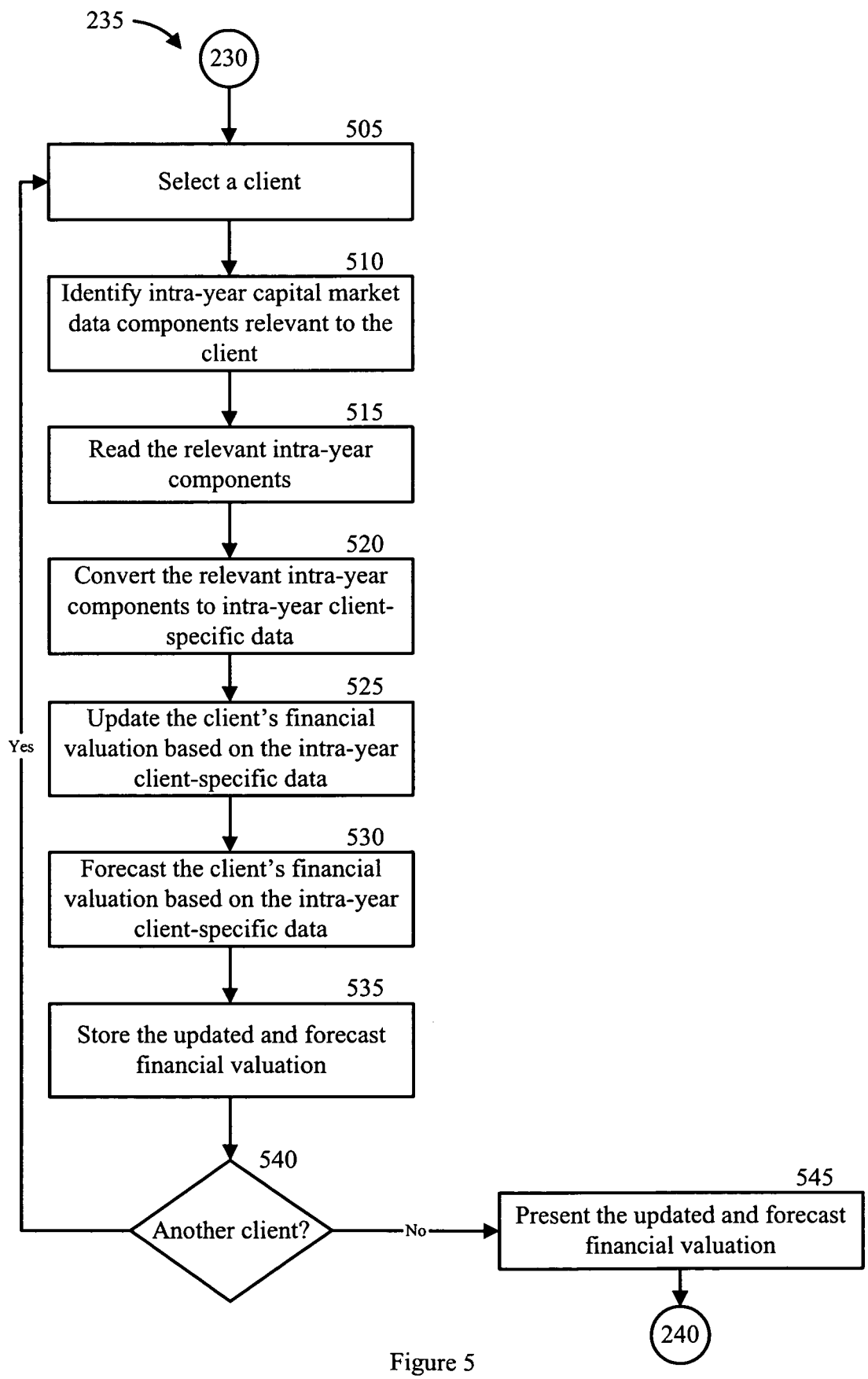
FIG. 5 is a flow chart depicting a method for performing an intra-year financial valuation update according to an exemplary embodiment of the present invention.

FIG. 5 is a flow chart depicting a method 235 for performing an intra-year financial valuation update according to an exemplary embodiment of the present invention, as referred to in step 235 of FIG. 2. The method 235 will be described with reference to FIGS. 1 and 5.

In step 505, the update module 130 identifies a client. In an exemplary embodiment, the update module 130 can identify a client by selecting the first client in a list of clients with records stored in the database 114. Alternatively, the update module 130 can identify a client based on a request to perform an intra-year financial valuation update received from the client.

In step 510, the update module 130 identifies intra-year capital market data components that are relevant to the selected client. In an exemplary embodiment, the relevant components can comprise particular components of capital market data used in the client's financial valuation. The update module 130 or the database 114 can associate an identifier of the relevant components with the client. In step 515, the update module 130 reads the relevant components of intra-year capital market data from the database 114.

In an alternative exemplary embodiment, the update module 130 can communicate a query to the database 114 to identify the relevant intra-year components of capital market data. Then, the database 114 can communicate the relevant intra-year components of capital market data to the update module 130.

In step 520, the update module 130 converts the relevant intra-year components of capital market data to intra-year client-specific data. The update module 130 can perform that conversion based on the client-specific assumptions stored in the database 114. In an exemplary embodiment, the update module can input the relevant intra-year components into the specific calculation engine developed for the client. Then, the calculation engine can determine how changes in the capital market data affect the benefit plan's valuation. For example, the calculation engine can determine the change in a particular "key" bond index representative of high quality, corporate-grade fixed income investments in the plan's home country, then apply a fraction of that change (from 0% to 100%) to each appropriate actuarial assumption. More refined, plan-specific approaches can be programmed into the calculation engine by actuarial consulting teams.

In step 525, the update module 130 updates the client's financial valuation based on the intra-year client-specific data to provide an intra-year financial valuation. The intra-year financial valuation comprises an estimate of a benefit plan's financial value based on current capital market data and the client's valuation assumptions. In an exemplary embodiment, the update module 130 can input the intra-year client-specific data, along with experience, plan benefit data, or other relevant data, into the specific calculation engine developed for the client based on the rules established for the client. Then, the calculation engine can compute the intra-year updated financial valuation for the client's benefit plan.

In step 530, the forecast module 132 forecasts the client's financial valuation based on the intra-year client-specific data. In an exemplary embodiment, the forecast module 132 forecasts the financial value to the period ending on the client's next annual actuarial valuation date. The forecast module 120 also can forecast the client's financial valuation for multiple years beyond the next annual actuarial valuation date. In an exemplary embodiment, the forecast module can provide a five-year forecast of the client's financial valuation. The forecast module 132 forecasts the client's financial valuation by inputting the intra-year client-specific data into forecast calculations specific to the client's benefit plans. In an exemplary embodiment, the forecast module 132 can input the intra-year client-specific data, along with experience, plan benefit data, or other relevant data, into the specific calculation engine developed for the client based on the rules established for the client. The specific calculation engine can comprise the forecast calculations specific to the client's benefit plans. Then, the calculation engine can compute the forecast intra-year financial valuation for the client's benefit plan. Step 530 comprises a process similar to step 525, except that considerations are allowed for future assumptions to vary from the intra-year determination. For example, it might be assumed that health care cost trend rates will approach rates of medical or general inflation, whereas most assumptions (discount rates, salary scales, etc.) are expected to remain unchanged. In other words, future valuation assumptions may vary from newly developed intra-year assumptions. Another example is the set of interest rates used for valuation of current liability, which are averaged over a rolling four-year period and will therefore blend known historical indices with anticipated future rates.

Thus, the intra-year financial valuations are developed using techniques to "roll-forward" assets, liabilities, and other values from an actual actuarial valuation to another date less than one year later or before the next scheduled actual actuarial valuation. For example, a plan's future projected benefit obligation (PBO) is expected to increase by a portion of the plan's service cost and interest cost (as measured for that period) and to be reduced by plan disbursements (benefit payments) for the same period. The resulting PBO can be further adjusted to account for changes in actuarial assumptions (e.g., discount rate, salary scale, etc.), experience different than expected (e.g., salary increases greater or less than expected) and/or other changes, such as plan benefits, demographic changes, or settlements/curtailments. Accordingly, the changed data can be collected and combined with previously established data to develop the updated financial valuation, including the updated forecast financial valuation.

In step 535, the update module 130 stores the updated financial valuation, including the updated forecast financial valuation, in the database 114. The method then proceeds to step 540.

In step 540, the method 235 determines whether to perform a financial valuation update for another client. If yes, then the method branches back to step 505 to perform a financial valuation update for another client. If not, then the method branches to step 545. In step 545, the web server 108 retrieves the updated financial valuation, including the updated forecast financial valuation, from the database 114 and communicates the updated data to the client computer 102 via the network 104. The client computer 102 presents the intra-year updated financial valuation to the client. The method then proceeds to step 240 (FIG. 2).

Figure 6:
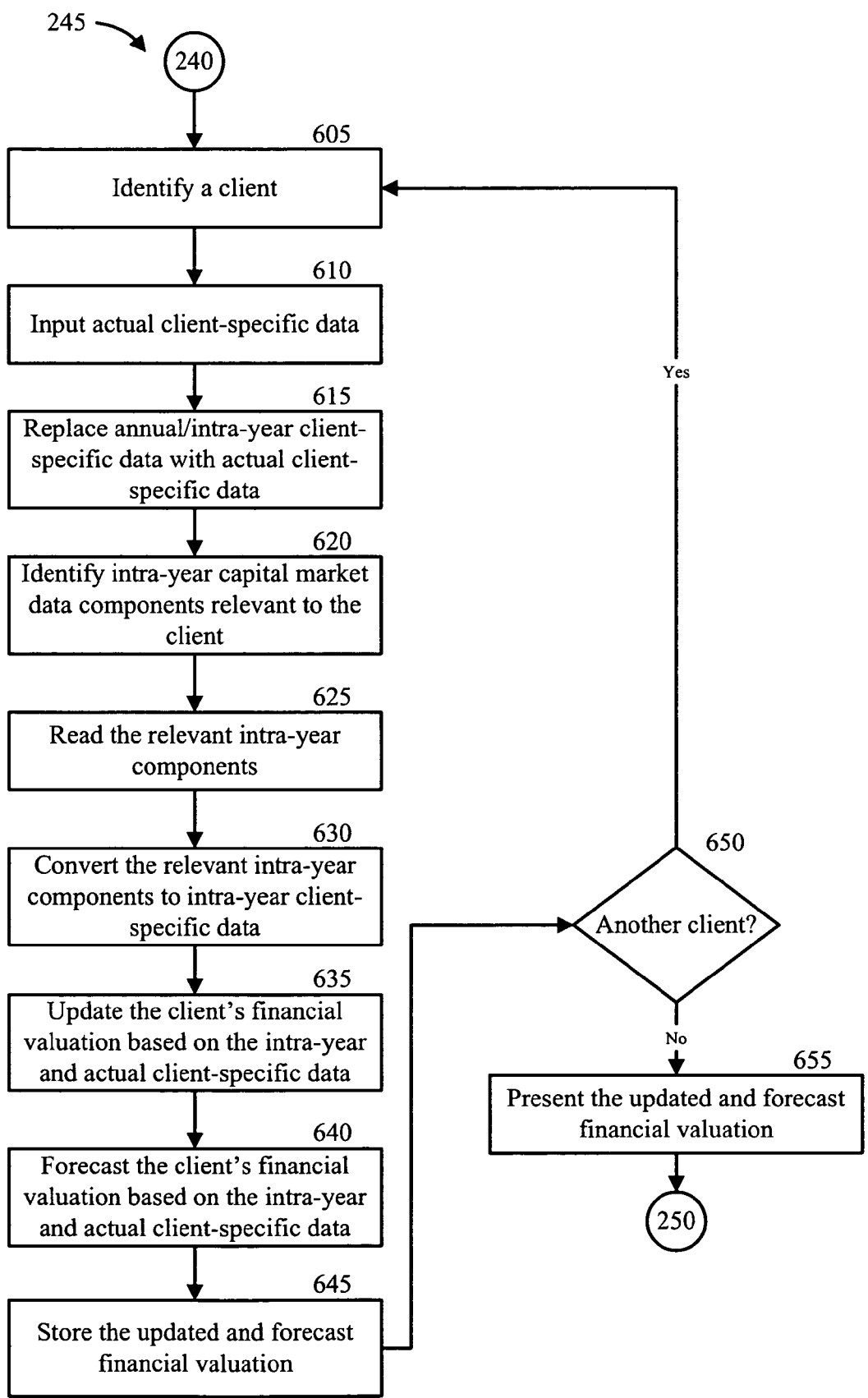
FIG. 6 is a flow chart depicting a method for calibrating an intra-year financial valuation according to an exemplary embodiment of the present invention.

FIG. 6 is a flow chart depicting a method 245 for calibrating an intra-year financial valuation according to an exemplary embodiment of the present invention, as referred to in step 245 of FIG. 2. The method 245 will be described with reference to FIGS. 1 and 6.

In step 605, a client is identified. The method 245 can identify a client based on input received from a client computer 102 via the network 104. For example, a client can access the web server 108 via the network 104 and its client computer 102. When the client logs in to the web server 108, the method 245 can identify the client. Alternatively, the method 245 can identify a client based on a request to perform the calibration function received from the client.

In step 610, the client can input actual client-specific data into the calibration module 134. The client can input that data into the client computer 102, which can communicate the data to the web server 108 via the network 104. Then, the web server 108 can communicate the actual client-specific data to the calibration module 134. The actual client-specific data comprises actual benefit plan performance data achieved since the previous annual actuarial valuation.

In step 615, the calibration module 134 replaces annual or intra-year client-specific data or client benefit plan data stored in the database 114 with the actual client-specific data input by the client. Accordingly, the outdated information is replaced with the actual client-specific data.

The method then proceeds in steps 620-640 to perform an updated financial valuation based on the actual client-specific data. In step 620, intra-year capital market data components relevant to the client are identified. In that regard, only intra-year capital market data components that were not replaced with actual client-specific data can be identified in step 620. Otherwise, step 620 can be performed in a manner similar to that described previously with reference to step 510 of FIG. 5.

In step 625, the relevant components of intra-year capital market data are read from the database 114. In that regard, step 625 can be performed in a manner similar to that described previously with reference to step 515 of FIG. 5.

In step 630, the update module 130 converts the relevant intra-year components of capital market data to intra-year client-specific data. In that regard, step 630 can be performed in a manner similar to that described previously with reference to step 520 of FIG. 5.

In step 635, the update module 130 updates the client's financial valuation based on the intra-year and actual client-specific data. In that regard, step 635 can be performed in a manner similar to that described previously with reference to step 525 of FIG. 5, except for using the actual client-specific data in place of certain components of intra-year client-specific data. In an exemplary embodiment, the update module 130 can input the actual client-specific data and uncalibrated components of the intra-year client-specific data, along with experience, plan benefit data, or other relevant data, into the specific calculation engine developed for the client based on the rules established for the client. Then, the calculation engine can compute the intra-year updated financial valuation for the client's benefit plan. In an exemplary embodiment, the calculation performed in step 635 can be identical to the calculation performed in step 525 discussed previously, where the results of an actuarial valuation are "rolled-forward" to project assets and liabilities from one measurement date to another. However, step 635 includes the actual client-specific data in that calculation.

In step 640, the forecast module 132 forecasts the client's financial valuation based on the intra-year and actual client-specific data. In that regard, step 640 can be performed in a manner similar to that described previously with reference to step 530 of FIG. 5, except for using the actual client-specific data in place of certain components of intra-year client-specific data. In an exemplary embodiment, the forecast module 132 can input the actual client-specific data and unchanged components of the intra-year client-specific data, along with experience, plan benefit data, or other relevant data, into the specific calculation engine developed for the client based on the rules established for the client. The specific calculation engine can comprise the forecast calculations specific to the client's benefit plans. Then, the calculation engine can compute the forecast intra-year financial valuation for the client's benefit plan. In an exemplary embodiment, the calculation performed in step 640 can be identical to the calculation performed in step 530 discussed previously, where the results of an actuarial valuation are "rolled-forward" to project assets and liabilities from one measurement date to another. However, step 640 includes the actual client-specific data in that calculation.

In step 645, the update module 130 stores the updated financial valuation, including the updated forecast valuation, in the database 114. The method then proceeds to step 650.

In step 650, the method 245 determines whether to calibrate another client's financial valuation. If yes, then the method branches back to step 605 to perform another calibration function. If not, then the method branches to step 655.

In step 655, the web server 108 retrieves the updated financial valuation, including the updated forecast financial valuation, from the database 114 and communicates the updated data to the client computer 102 via the network 104. The client computer 102 presents the updated financial valuation to the client. The method then proceeds to step 250 (FIG. 2).

Figure 7:
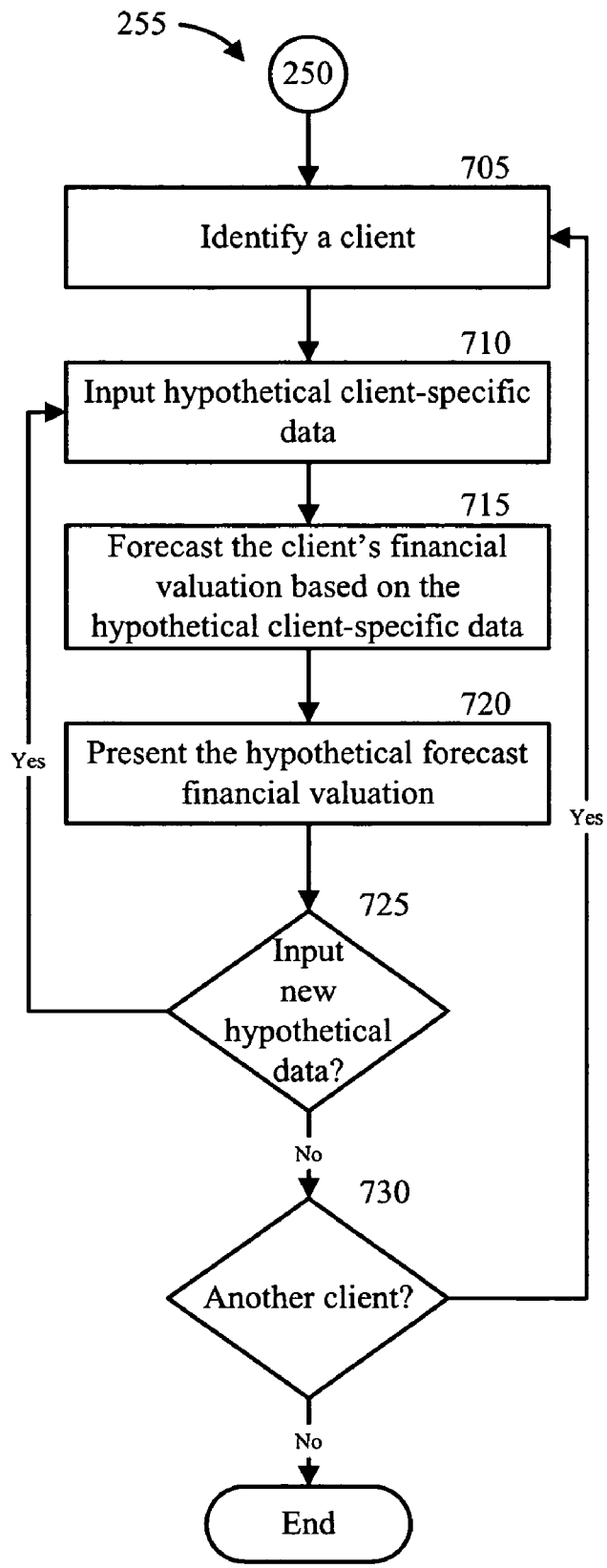
FIG. 7 is a flow chart depicting a method for performing a hypothetical intra-year financial valuation according to an exemplary embodiment of the present invention.

FIG. 7 is a flow chart depicting a method 255 for performing a hypothetical intra-year financial valuation according to an exemplary embodiment of the present invention, as referred to in step 255 of FIG. 2. The method 255 will be described with reference to FIGS. 1 and 7.

In step 705, the method 255 identifies a client. The method 255 can identify a client based on the client accessing the intra-year financial valuation processing site 106 via the network 104. In that regard, when the client logs into the web server 108 via the client computer 102, the web server 108 can identify the client. Alternatively, the method 255 can identify a client based on a request to perform the calibration function received from the client.

In step 710, the client inputs hypothetical client-specific data into the client computer 102, which communicates that data to the hypothetical module 136 via the network 104 and the web server 108. The hypothetical module 136 then communicates the hypothetical client-specific data to the database 114. In an exemplary embodiment, the hypothetical module 136 can present a complete set of financial data to the client via the client computer 102. Then, the client can change one or more of the components in the complete set of financial data by inputting a new data component value into the client computer 102.

In step 715, the forecast module 132 reads the hypothetical client-specific data from the database 114 and unchanged intra-year or annual client-specific data from the database 114, along with experience, plan benefit data, or other relevant data, and forecasts the client's financial valuation based on the hypothetical client-specific data. In an exemplary embodiment, the benefit plan's calculation engine can comprise the hypothetical forecast calculations for a hypothetical forecast financial valuation. The forecast module 132 stores the hypothetical forecast financial valuation in the database 114.

In step 720, the web server 108 retrieves the hypothetical forecast financial valuation from the database 114 and communicates the hypothetical forecast financial valuation via the network 104 to the client computer 102. The client computer 102 presents the hypothetical forecast financial valuation to the client.

In step 725, the method 255 determines whether the client has input new hypothetical data. In an exemplary embodiment, the client may desire to input new hypothetical data to forecast a different financial scenario. If the method 255 determines in step 725 that the client has input new hypothetical data, then the method branches back to step 710 to repeat the hypothetical forecast function. If the client has not input new hypothetical data, then the method branches to step 730.

In step 730, the method 255 determines whether to perform a hypothetical financial valuation for another client. The method 255 can make that determination based on a new client accessing the web server 108, or a new client requesting the hypothetical function. If the method 255 detects another client, then the method branches back to step 705 to perform a hypothetical financial valuation for that client. If the method 255 does not detect another client in step 730, then the method ends.

Exemplary client user interfaces for presenting information to, and interacting with, the client via the processing site 106 will be described with reference to FIGS. 10-19.

Figure 11:
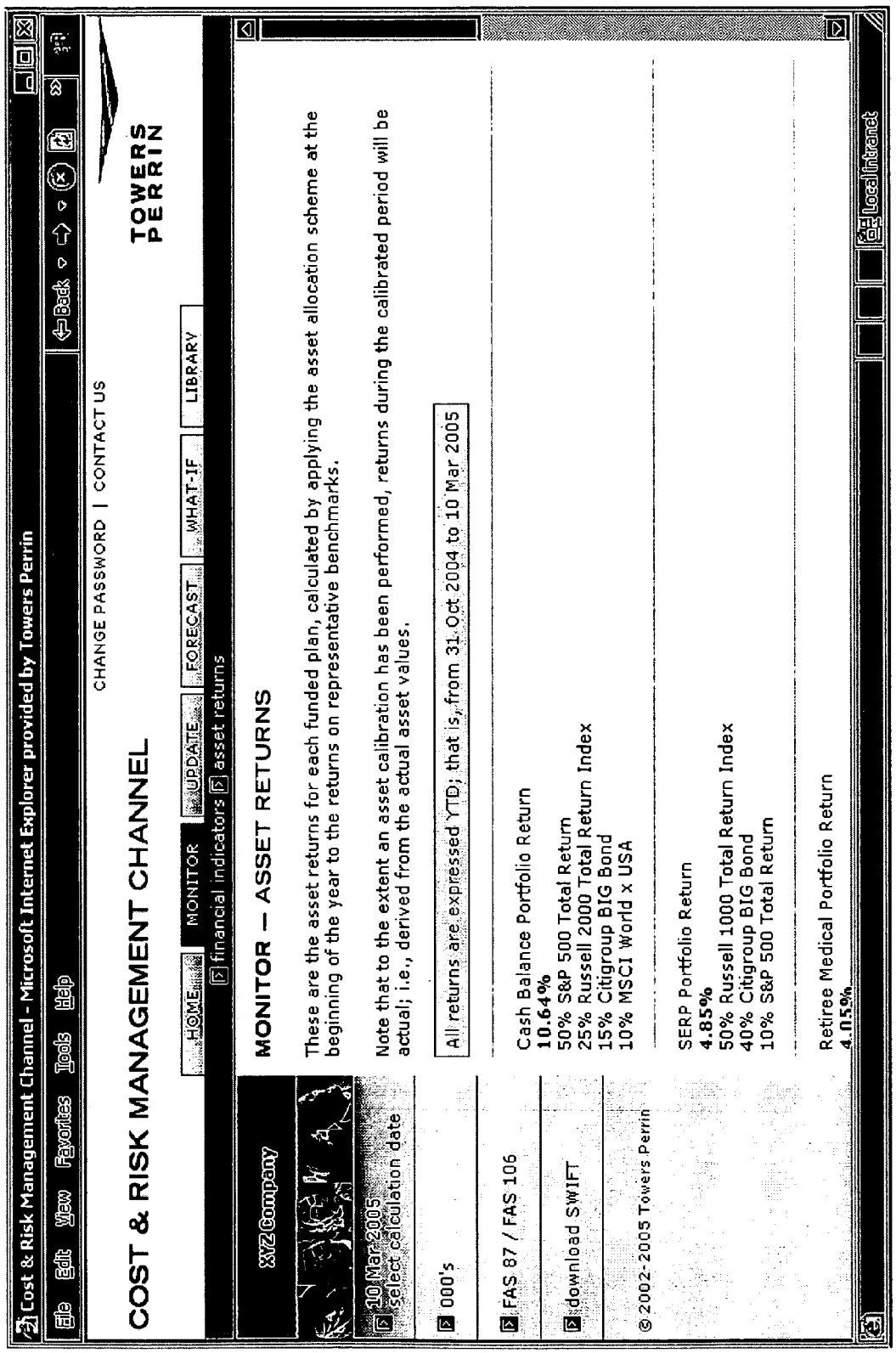
FIG. 11 illustrates a representative client user interface for presenting intra-year asset returns for a client's funded benefit plans according to an exemplary embodiment of the present invention.

FIGS. 10 and 11 illustrate exemplary user interfaces for monitoring intra-year financial indicators and asset returns for a client's benefit plans. The monitoring user interfaces can present the capital market results that are most relevant to the benefit plans, for example, economic indices, benchmark returns for invested asset classes, bond yields, or other suitable information. FIG. 10 illustrates a representative client user interface for presenting intra-year financial indicators of costs for a client's benefit plans according to an exemplary embodiment of the present invention. Each indicator is a factor in determining the benefit plans' liabilities and net periodic post-retirement benefit costs. FIG. 11 illustrates a representative client user interface for presenting intra-year asset returns for a client's funded benefit plans according to an exemplary embodiment of the present invention. The asset returns for each funded plan are calculated by applying the asset allocation scheme at the beginning of the year to the returns on representative benchmarks. A benchmark portfolio return can be developed by applying known weights to proxies for each type of investment class. If the client has performed an asset calibration, then the returns during the calibrated period will be actual returns, i.e., derived from the actual asset values.

FIGS. 12-14 illustrate exemplary user interfaces for presenting intra-year updated financial valuations for a client's benefit plans. The user interfaces can provide an exemplary statement of a benefit plan's updated and current financial condition, reconciled to prior results and projections. Such updated results can be generated at least as often as each day based on bond yields and index returns, for example. The updated results can comprise the affects of the most current economic environment. The user interfaces also can present the current financial status of the plans, on both the current date and projected to the next measurement date. FIG. 12 illustrates a representative client user interface for presenting a summary of intra-year updated annual costs and policy contributions of a client's benefit plans according to an exemplary embodiment of the present invention. FIG. 13 illustrates a representative client user interface for presenting details of the intra-year updated financial condition of a client's benefit plan according to an exemplary embodiment of the present invention. FIG. 14 illustrates a representative client user interface for presenting details of the intra-year updated financial condition of a client's multiple benefit plans according to an exemplary embodiment of the present invention.

FIG. 15 illustrates a representative client user interface for requesting the intra-year calibration function for a client's benefit plan according to an exemplary embodiment of the present invention. As illustrated, the client can select a benefit plan to calibrate, which will call the calibration function for that plan.

FIGS. 16-19 illustrate exemplary user interfaces for presenting intra-year forecast information for a client's benefit plans. The exemplary user interfaces can present longer-term projections of financial results, such as a five-year projection for the client's benefit plans. The user interfaces also can provide the hypothetical analysis capability. FIG. 16 illustrates a representative client user interface for presenting an intra-year summary forecast of costs and policy contributions of a client's benefit plans according to an exemplary embodiment of the present invention. FIG. 17 illustrates a representative client user interface for presenting details of the intra-year forecasted financial condition of a client's benefit plan according to an exemplary embodiment of the present invention. FIG. 18 illustrates a representative client user interface for presenting details of the intra-year forecasted financial condition of a client's multiple benefit plans according to an exemplary embodiment of the present invention.

FIG. 19 illustrates a representative client user interface for inputting hypothetical data for a benefit plan for use in a hypothetical financial valuation according to an exemplary embodiment of the present invention. As illustrated, the client can input hypothetical capital market data and benefit plan data for a hypothetical financial valuation. In an exemplary embodiment, the hypothetical data can comprise new economic scenarios for assumptions, plan experience, and contribution policy. Additionally, customized forecast results can be viewed side-by-side with baseline results.

The present invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the present invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the present invention defined in the following claims, the scope of which is to be accorded the broadest interpretation so as to encompass such modifications and equivalent structures.

What is claimed is:

1. A computer-implemented method for intra-year benefit plan financial valuation, comprising the steps of:
    performing a first actuarial valuation for the benefit plan of a client based on client assumptions, first client-specific data derived from capital market data collected for the first actuarial valuation, and benefit plan data comprising data collected for the first actuarial valuation and that impacts the financial valuation of the benefit plan;
    collecting intra-year capital market data during a time period between the first actuarial valuation and a second actuarial valuation;
    converting via a computer the intra-year capital market data to intra-year client-specific data based on the client assumptions;
    calculating via a computer an updated intra-year financial valuation for the benefit plan based on the intra-year client-specific data, the benefit plan data, and the client assumptions, wherein the updated intra-year financial valuation is conducted during a time period after the first actuarial valuation and prior to the second actuarial valuation; and
    presenting the updated intra-year financial valuation.

2. The computer-implemented method according to claim 1, wherein said converting step comprises the steps of:
    determining a change in a component of the intra-year capital market data; and
    applying a fraction of that change to at least one client assumption.

3. The computer-implemented method according to claim 1, wherein said collecting step comprises the steps of:
    querying a data source for the intra-year capital market data;
    receiving the intra-year capital market data from the data source in response to said querying step; and
    storing the intra-year capital market data for use in said converting step.

4. The computer-implemented method according to claim 1, wherein said calculating step further comprises calculating an updated forecast financial valuation based on the intra-year client-specific data, the benefit plan data, and the client assumptions, wherein the client assumptions comprise intra-year and future client assumptions.

5. The computer-implemented method according to claim 4, wherein the updated forecast financial valuation provides a forecast for the period ending on a date of a scheduled second actuarial valuation.

6. The computer-implemented method according to claim 1, further comprising the step of calibrating at least one of the first client-specific data, the intra-year client specific data, the client assumptions, and the benefit plan data based upon actual client-specific data reflecting experience between the time of the first actuarial valuation and the updated financial valuation.

7. The computer-implemented method according to claim 6, wherein said calibrating step comprises the steps of:
    receiving the actual client-specific data; and
    replacing at least one of the first client-specific data, the intra-year client specific data, the client assumptions, and the benefit plan data, with the actual client-specific data,
    wherein said calculating step calculates the updated financial valuation based on the actual client-specific data.

8. The computer-implemented method according to claim 7, wherein said calculating step further comprises calculating an updated forecast financial valuation based on the actual client-specific data and the client assumptions, wherein the client assumptions comprise intra-year and future client assumptions.

9. The computer-implemented method according to claim 1, further comprising the step of receiving hypothetical client-specific data for at least one of the first client-specific data, the intra-year client specific data, the client assumptions, and the benefit plan data,
    wherein the updated intra-year financial valuation calculated in said calculating step comprises a hypothetical forecast financial valuation based on the hypothetical client-specific data.

10. A computer-readable medium having embedded therein a set of computer-executable instructions that when executed cause a computer to implement a process of performing an intra-year benefit plan financial valuation comprising the steps of:
    performing a first actuarial valuation for the benefit plan of a client based on client assumptions, first client-specific data derived from capital market data collected for the actuarial valuation, and benefit plan data comprising data collected for the actuarial valuation that impacts the financial valuation of the benefit plan;
    collecting intra-year capital market data during a time period between the first actuarial valuation and a second actuarial valuation;
    converting the intra-year capital market data to intra-year client-specific data based on the client assumptions;
    calculating an updated intra-year financial valuation for the benefit plan based on the intra-year client-specific data, the benefit plan data, and the client assumptions, wherein the updated intra-year financial valuation is conducted during a time period after the first actuarial valuation and prior to the second actuarial valuation; and
    presenting the updated intra-year financial valuation.

11. A system for intra-year benefit plan financial valuation, comprising:
    a database storing information for a plurality of clients, the information regarding a plurality of first actuarial valuations each for respective benefit plan of the clients, wherein the information for a first actuarial valuation for a selected one of the clients is based on client-specific assumptions, first client-specific data derived from capital market data collected for the actuarial valuations, and client-specific benefit plan data, the client-specific benefit plan data comprising data collected for the actuarial valuation that impacts the financial valuation of the benefit plan of the selected client;

a data collection module that collects a plurality of components of intra-year capital market data during a time period between the respective first actuarial valuation and a second actuarial valuation for the selected client;

an update module that identifies a particular one of the components of intra-year capital market data relevant to the benefit plan of the selected client, that converts the particular component of intra-year capital market data to intra-year client-specific data for the selected client based on the client-specific assumptions, and that stores the intra-year client specific data in said database; and a calibration module that calibrates, for the selected client, at least one of the first client-specific data, the intra-year client specific data, the client-specific assumptions, and the client-specific benefit plan data based upon actual client-specific data reflecting the selected client's experience between the time of the first actuarial valuation and an updated intra-year financial valuation for the benefit plan of the selected client, thereby creating calibrated data, wherein said update module calculates the updated intra-year financial valuation for the benefit plan of the selected client based on the calibrated data, and wherein the updated intra-year financial valuation is conducted during a time period after the first actuarial valuation and prior to the second actuarial valuation.

12. The system according to claim 11, wherein said calibration module is operable to calibrate the data by performing the steps comprising:

receiving the actual client-specific data; and replacing at least one of the first client-specific data, the intra-year client specific data, the client-specific assumptions, and the client-specific benefit plan data stored in the database with the actual client-specific data.

13. The system according to claim 12, wherein said updated intra-year financial valuation for the benefit plan of the selected client comprises an updated forecast financial valuation based on the actual client-specific data and the respective client-specific assumptions, wherein the client-specific assumptions comprise intra-year and future client-specific assumptions.

14. The system according to claim 13, wherein the updated intra-year forecast financial valuation provides a forecast for the period ending on a date of a scheduled second actuarial valuation.

15. The system according to claim 11, wherein said update module is operable to convert the particular component of intra-year capital market data to intra-year client-specific data for the selected client by performing the steps comprising:

determining a change in a component of the intra-year capital market data relevant to the benefit plan of the selected client; and applying a fraction of that change to at least one client-specific assumption for the benefit plan of the selected client.

16. The system according to claim 11, wherein said data collection module is operable to collect the components of intra-year capital market data by performing the steps comprising:

querying a data source for at least one of the components of intra-year capital market data;

receiving the at least one of the components of intra-year capital market data from the data source in response to said querying step; and storing the at least one of the components of intra-year capital market data in said database.

17. The system according to claim 11, further comprising a server that communicates the updated financial valuation for presentation to the selected client.

18. The system according to claim 11, further comprising a hypothetical module that receives, for the selected client, hypothetical client-specific data for at least one of the first client-specific data, the intra-year client specific data, the client-specific assumptions, and the client-specific benefit plan data, wherein the updated financial valuation calculated by said update module comprises a hypothetical forecast financial valuation based on the hypothetical client-specific data.

19. A computer-implemented method for intra-year benefit plan financial valuation, comprising the steps of:

performing a first actuarial valuation for the benefit plan of a client based on client assumptions, first client-specific data derived from capital market data collected for the actuarial valuation, and benefit plan data comprising data collected for the actuarial valuation that impacts the financial valuation of the benefit plan;

collecting intra-year capital market data during a time period between the first actuarial valuation and a second actuarial valuation;

converting via a computer the intra-year capital market data to intra-year client-specific data based on the client assumptions; and calculating via the computer an updated intra-year financial valuation and an updated forecast financial valuation for the benefit plan based on the intra-year client-specific data, the benefit plan data, and the client assumptions, wherein the updated intra-year financial valuation and the updated forecast financial valuation are conducted during a time period after the first actuarial valuation and prior to the second actuarial valuation.

20. The computer-implemented method according to claim 19, wherein, for calculating the updated forecast financial valuation, the client assumptions comprise intra-year and future client assumptions.

21. The computer-implemented method according to claim 19, wherein the updated forecast financial valuation provides a forecast for the period ending on a date of a scheduled second actuarial valuation.

22. The computer-implemented method according to claim 19, wherein said converting step comprises the steps of:

determining a change in a component of the intra-year capital market data; and applying a fraction of that change to at least one client assumption.

23. The computer-implemented method according to claim 19, wherein said collecting step comprises the steps of:

querying a data source for the intra-year capital market data;

receiving the intra-year capital market data from the data source in response to said querying step; and storing the intra-year capital market data for use in said converting step.

24. The computer-implemented method according to claim 19, further comprising the step of presenting the updated r financial valuation to the client.

25. The computer-implemented method according to claim 19, further comprising the step of calibrating at least one of the first client-specific data, the intra-year client specific data, the client assumptions, and the benefit plan data based upon actual client-specific data reflecting experience between the time of the first actuarial valuation and the updated intra-year financial valuation.

26. The computer-implemented method according to claim 25, wherein said calibrating step comprises the steps of:
receiving the actual client-specific data; and
replacing at least one of the first client-specific data, the intra-year client specific data, the client assumptions, and the benefit plan data, with the actual client-specific data,
wherein said calculating step calculates the updated intra-year financial valuation based on the actual client-specific data.

27. The computer-implemented method according to claim 19, further comprising the step of receiving hypothetical client-specific data for at least one of the first client-specific data, the intra-year client specific data, the client assumptions, and the benefit plan data,
wherein the updated intra-year financial valuation calculated in said calculating step comprises a hypothetical forecast financial valuation based on the hypothetical client-specific data.

28. A computer-readable medium having embedded therein a set of computer-executable instructions that when executed cause a computer to implement a process of performing an intra-year benefit plan financial valuation comprising the steps of:
performing a first actuarial valuation for the benefit plan of a client based on client assumptions, first client-specific data derived from capital market data collected for the actuarial valuation, and benefit plan data comprising data collected for the actuarial valuation that impacts the financial valuation of the benefit plan;
collecting intra-year capital market data during a time period between the first actuarial valuation and a second actuarial valuation;
converting the intra-year capital market data to intra-year client-specific data based on the client assumptions; and
calculating an updated intra-year financial valuation and an updated forecast financial valuation for the benefit plan prior to the second actuarial valuation based on the intra-year client-specific data, the benefit plan data, and the client assumptions, wherein the updated intra-year financial valuation and the updated forecast financial valuation are conducted during a time period after the first actuarial valuation and prior to the second actuarial valuation.

* * * * *